July 7, 1959 C. H. BERGSLAND ET AL 2,893,009

MACHINE FOR ASSEMBLING CIRCUIT COMPONENTS

Filed Feb. 15, 1955 19 Sheets-Sheet 1

INVENTORS
CHARLES H. BERGSLAND
THOMAS R. JAMES
RAYMOND S. KARINEN
GEORGE A. KWASNIEWSKI
KARL E. NEUMEIER
BY William C. Stueber July 7, 1959 C. H. BERGSLAND ET AL 2,893,009

MACHINE FOR ASSEMBLING CIRCUIT COMPONENTS

Filed Feb. 15, 1955 19 Sheets-Sheet 2

INVENTORS
CHARLES H. BERGSLAND
THOMAS R. JAMES
RAYMOND S. KARINEN
GEORGE A. KWASNIEWSKI
KARL E. NEUMEIER
BY William C. Stueber INVENTORS
CHARLES H. BERGSLAND
THOMAS R. JAMES
RAYMOND S. KARINEN
GEORGE A. KWASNIEWSKI
KARL E. NEUMEIER
BY William C. Stueber July 7, 1959 C. H. BERGSLAND ET AL 2,893,009

MACHINE FOR ASSEMBLING CIRCUIT COMPONENTS

Filed Feb. 15, 1955 19 Sheets-Sheet 4

INVENTORS
CHARLES H. BERGSLAND
THOMAS R. JAMES
RAYMOND S. KARINEN
GEORGE A. KWASNIEWSKI
KARL E. NEUMEIER
BY William C. Stueber

MACHINE FOR ASSEMBLING CIRCUIT COMPONENTS

Filed Feb. 15, 1955

19 Sheets-Sheet 5

INVENTORS
CHARLES H. BERGSLAND
THOMAS R. JAMES
RAYMOND S. KARINEN
GEORGE A. KWASNIEWSKI
KARL E. NEUMEIER
BY William C. Stueber INVENTORS
CHARLES H. BERGSLAND
THOMAS R. JAMES
RAYMOND S. KARINEN
GEORGE A. KWASNIEWSKI
KARL E. NEUMEIER BY William C. Stueber July 7, 1959 C. H. BERGSLAND ET AL 2,893,009

MACHINE FOR ASSEMBLING CIRCUIT COMPONENTS

Filed Feb. 15, 1955 19 Sheets-Sheet 7

INVENTORS
CHARLES H. BERGSLAND
THOMAS R. JAMES
RAYMOND S. KARINEN
GEORGE A. KWASNIEWSKI
KARL E. NEUMEIER

BY William C. Stueber

MACHINE FOR ASSEMBLING CIRCUIT COMPONENTS

INVENTORS
CHARLES H. BERGSLAND
THOMAS R. JAMES
RAYMOND S. KARINEN
GEORGE A. KWASNIEWSKI
KARL E. NEUMEIER

BY William C. Stueber

INVENTORS
CHARLES H. BERGSLAND
THOMAS E. JAMES
RAYMOND S. KARINEN
GEORGE A. KWASNIEWSKI
KARL E. NEUMEIER
BY William C. Stueber INVENTORS
CHARLES H. BERGSLAND
THOMAS R. JAMES
RAYMOND S. KARINEN
GEORGE A. KWASNIEWSKI
KARL E. NEUMEIER
BY William C. Stueber INVENTORS
CHARLES H. BERGSLAND
THOMAS R. JAMES
RAYMOND S. KARINEN
GEORGE A. KWASNIEWSKI
KARL E. NEUMEIER
BY William C. Stueber

MACHINE FOR ASSEMBLING CIRCUIT COMPONENTS

Filed Feb. 15, 1955 19 Sheets-Sheet 12

INVENTOR.
CHARLES H. BERGSLAND
THOMAS R. JAMES
RAYMOND S. KARINEN
GEORGE A. KWASNIEWSKI
KARL E. NEUMEIER

BY William C. Stueber

INVENTORS
CHARLES H. BERGSLAND
THOMAS R. JAMES
RAYMOND S. KARINEN
GEORGE A. KWASNIEWSKI
KARL E. NEUMEIER
BY William C. Stueber INVENTORS
CHARLES H. BERGSLAND
THOMAS R. JAMES
RAYMOND S. KARINEN
GEORGE A. KWASNIEWSKI
KARL E. NEUMEIER
BY William C. Stueber July 7, 1959 C. H. BERGSLAND ET AL 2,893,009

MACHINE FOR ASSEMBLING CIRCUIT COMPONENTS

Filed Feb. 15, 1955 19 Sheets-Sheet 15

INVENTORS
CHARLES H. BERGSLAND
THOMAS R. JAMES
RAYMOND S. KARINEN
GEORGE A. KWASNIEWSKI
KARL E. NEUMEIER

BY William C. Stueber

MACHINE FOR ASSEMBLING CIRCUIT COMPONENTS

Filed Feb. 15, 1955 19 Sheets-Sheet 16

INVENTORS
CHARLES H. BERGSLAND
THOMAS R. JAMES
RAYMOND S. KARINEN
GEORGE A. KWASNIEWSKI
KARL E. NEUMEIER

BY William C. Stueber

INVENTORS
CHARLES H. BERGSLAND
THOMAS R. JAMES
RAYMOND S. KARINEN
GEORGE A. KWASNIEWSKI
KARL E. NEUMEIER
BY William C. Stueber July 7, 1959 C. H. BERGSLAND ET AL 2,893,009
MACHINE FOR ASSEMBLING CIRCUIT COMPONENTS
Filed Feb. 15, 1955 19 Sheets-Sheet 18
Fig 50
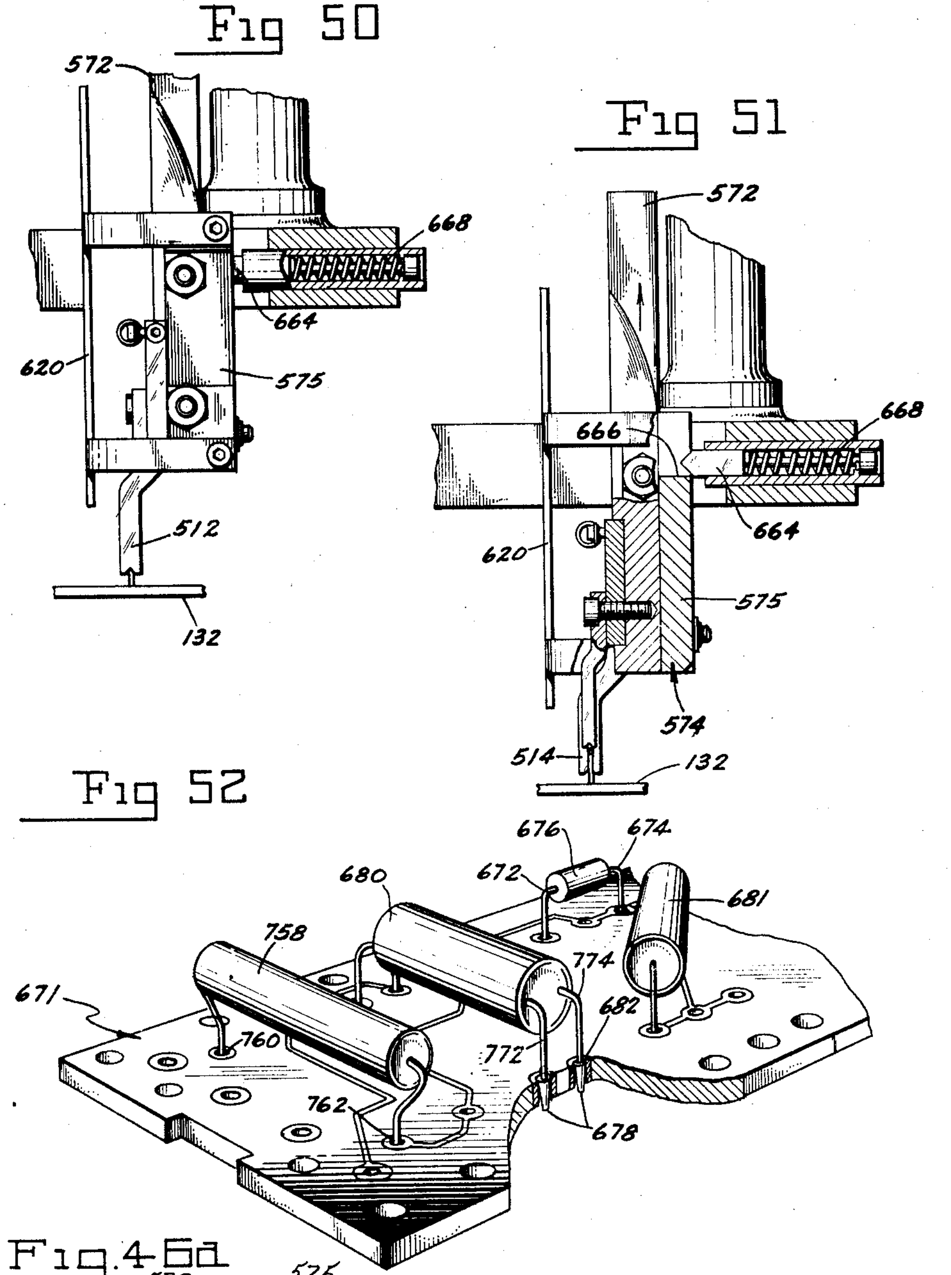
Fig 51, Fig 52
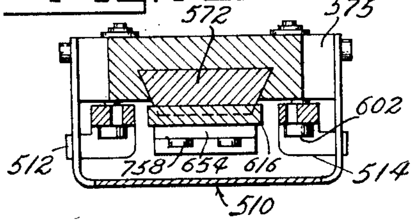
Fig. 46a
INVENTORS
CHARLES H. BERGSLAND
THOMAS R. JAMES
RAYMOND S. KARINEN
GEORGE A. KWASNIEWSKI
KARL E. NEUMEIER
BY William C. Stueber July 7, 1959 C. H. BERGSLAND ET AL 2,893,009

MACHINE FOR ASSEMBLING CIRCUIT COMPONENTS

Filed Feb. 15, 1955 19 Sheets-Sheet 19

INVENTORS
CHARLES H. BERGSLAND
THOMAS R. JAMES
RAYMOND S. KARINEN
GEORGE A. KWASNIEWSKI
KARL E. NEUMEIER

BY William C. Stueber

United States Patent Office 2,893,009
Patented July 7, 1959

2,893,009

MACHINE FOR ASSEMBLING CIRCUIT COMPONENTS

Charles H. Bergsland, Stillwater, Thomas R. James, Minneapolis, Raymond S. Karinen, St. Paul, George A. Kwasniewski, Minneapolis, and Karl E. Neumeier, Stillwater, Minn., assignors to General Mills, Inc., a corporation of Delaware Application February 15, 1955, Serial No. 488,232

44 Claims. (Cl. 1—106)

The present invention relates to improvements in machines which will mount or attach electrical components to a circuit board and more specifically will receive a series of printed circuit boards and will automatically attach a plurality of different electrical components in selected positions on the board to complete the circuitry of each board.

Electrical circuitry for electrical devices which employ the vacuum tube or transistor consists primarily of a number of electrical components such as resistors, condensers, inductance coils, transformers, and the like. These components are attached in various parallel or series combinations to obtain the desired effects in the circuit. In the past mass production of electrical equipment has been accomplished largely by hand with the leads of the components being manually cut, bent, and soldered to each other.

This type of production has certain obvious disadvantages in that the human element is always present and mistakes are made requiring that each circuit be inspected and tested. Further, manual assembly of electrical equipment is very tedious and time-consuming, thus greatly increasing the expense of such equipment.

Attempts have been made to assemble electrical equipment by mechanical rather than manual means so as to speed up production, reduce error, and decrease unit cost of electrical equipment. These attempts, however, have resulted in assembling equipment with a number of disadvantages which have made it impossible to use this mechanical equipment except in certain select circumstances. Thus in many cases much of the electrical equipment has had to be assembled by the previous manual methods.

One of the difficulties faced lies in the fact that the electrical circuit must be changed for different electrical equipment. Thus a machine designed for assembly of one circuit usually can not be used for different circuits without extensive and costly changes. Also, with the necessity of using different types of electrical components, components of different values or capacities, and components of different sizes, a single machine generally is not adaptable to handling any and all components.

Some machines have attempted to use complicated programming equipment which will change the machine for each operation so that it will attach a succession of different types and sizes of components in different positions on the circuit board. This, however, results in intricate and complicated equipment which is accompanied by the difficulties inherent in complex machines.

It is therefore an object of the present invention to provide a machine which is simple and rugged in design and will mechanically assemble electrical equipment and will attach to a printed circuit board electrical components of different types, of different sizes, of different quantities, and of different shapes.

It is another object of the invention to provide a machine for mechanically assembling electrical equipment which is readily and quickly adapted to assemble different circuits which are changed in respect to the number of components which are used, the type of components which are used, the sequence in which the components are attached, the position on the circuit board in which the component must be attached, the orientation of the component on the board, and which will accommodate any other variation in requirement which must be met.

It is an important objective of the invention to provide a machine for mechanically assembling electrical equipment which utilizes individual attaching units operating as a whole but which may be added to or removed from the machine or individually adjusted with respect to the machine without altering or affecting the remainder of the machine, each unit operating to attach its individual component to the electrical circuit.

It is a more specific objective of the invention to provide a machine in accordance with the previous objective which utilizes a series of individual component attaching heads arranged along a conveyor wherein each of the heads is adjustable in longitudinal, lateral, and rotational position so that the attached position of any individual component may be altered or adjusted without the necessity of changing the location of the component board on the conveyor.

It is another more specific objective to provide a machine in accordance with the previous objectives in which a plurality of individual attaching heads are used wherein each head is individually changeable and adjustable to accommodate an electrical component of any size or type so that the type and size of an electrical component to be attached to the circuit board in a specific location can be quickly and readily changed without affecting or altering the position of the circuit board on the conveyor or affecting the mechanism for attaching the other components to the circuit board.

It is another objective to provide a machine for mechanically assembling electrical equipment in which the number of electrical components attached to a circuit board can be easily and readily changed for each pass of the circuit board through the machine by simply adding to or subtracting from the total number of component attaching heads, which may be done without affecting or altering the operation of the remainder of the machine.

It is another objective of the invention to provide a conveyor for carrying a series of circuit boards to a plurality of electrical component attaching stations wherein an electrical component is attached to the board at each station and wherein an improved mechanism is utilized for positioning the board with respect to the attaching mechanism so that the component leads may be accurately inserted into holes in the circuit board and each and all components will be securely attached to the board.

It is another object to provide a machine for mechanically assembling electrical equipment which will continue operation for an indefinite length of time with a minimum of attention and which will function to automatically and rapidly furnish its own supply of circuit boards and also furnish its own supply of electrical components to remain in continual operation.

An object is to provide a machine for automatically attaching electrical components to circuit boards in which the components and the boards are loaded in magazines without special preparation and in which the empty magazines can be replenished without interrupting the operation of the machine.

Another object of the invention is to provide a machine of the nature described which is provided with devices which will automatically terminate its continued operation upon the failure of a circuit component to be attached to the circuit board in its proper position and will also terminate its operation upon the absence of a circuit board to receive the electrical component which is to be attached thereto.

Another object is to provide an improved component attaching mechanism which bends the ends of the leads of individual components toward the circuit board and inserts them into holes in the circuit board, the mechanism being improved in operation to prevent damage to the component and to insure that the component will be perfectly attached with each operation.

Another object of the invention is to provide an improved mechanism for bending and handling the components wherein the component wires are curved to project into a concave groove in the handling mechanism so that they can not be accidentally dropped by the mechanism and so that they will be positively and firmly inserted into the circuit board.

A further object of the invention is to provide an improved component attaching mechanism which will attach large components to the circuit board wherein the body of the component is longer than the distance between the holes in the circuit board in which the leads must be inserted.

Another object of the invention is to provide an improved operating mechanism for the conveyor and the attaching head which will insure positive cooperation between the various machine elements and will insure efficient, fast, and continuous operation of the machine for building the electrical devices.

It is another object of the invention to provide a machine having a plurality of individual component attaching heads in which the failure of any single head to properly attach its component to the circuit board will stop the entire machine and in which means are provided to automatically indicate the head which failed to make the proper attachment.

A further object of the invention is to provide a machine for automatically attaching electrical components to a board with the components lying flat against the board or with the components raised to be spaced from the board.

Other objects and advantages will become more apparent in the following specification and the drawings.

Figures 12, 13, 14, 15, 16:
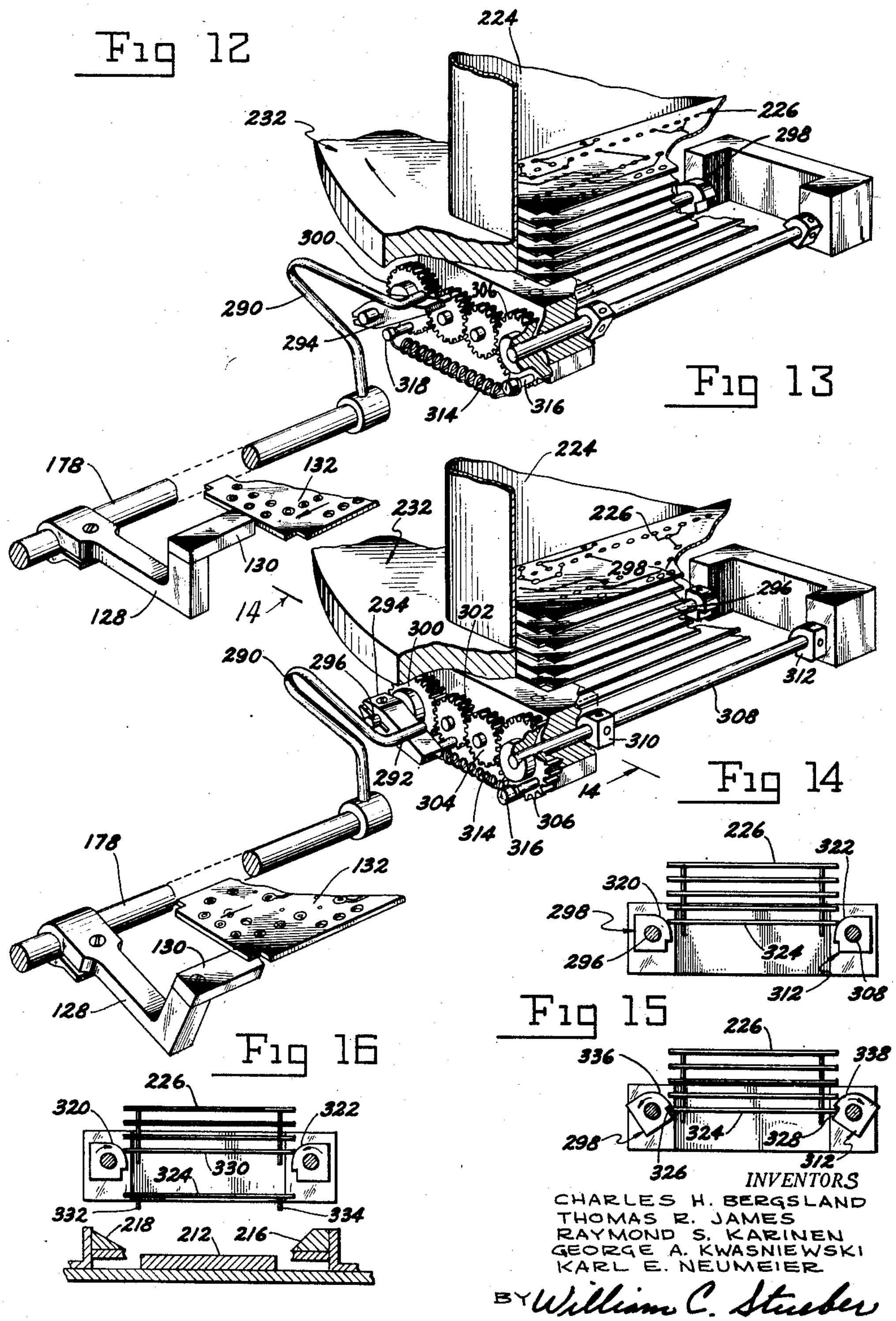
Figs. 12 and 13 are perspective views showing the details of the mechanism for depositing individual circuit boards on the conveyor, with Fig. 12 showing the mechanism as it begins to operate and Fig. 13 showing the mechanism as a board is dropped.

Figs. 14, 15, and 16 are sectional views taken along line 14 of Fig. 13 and illustrating the successive positions of the cam which supports the stack of circuit boards and individually releases a single board with each operation.

Figure 17:
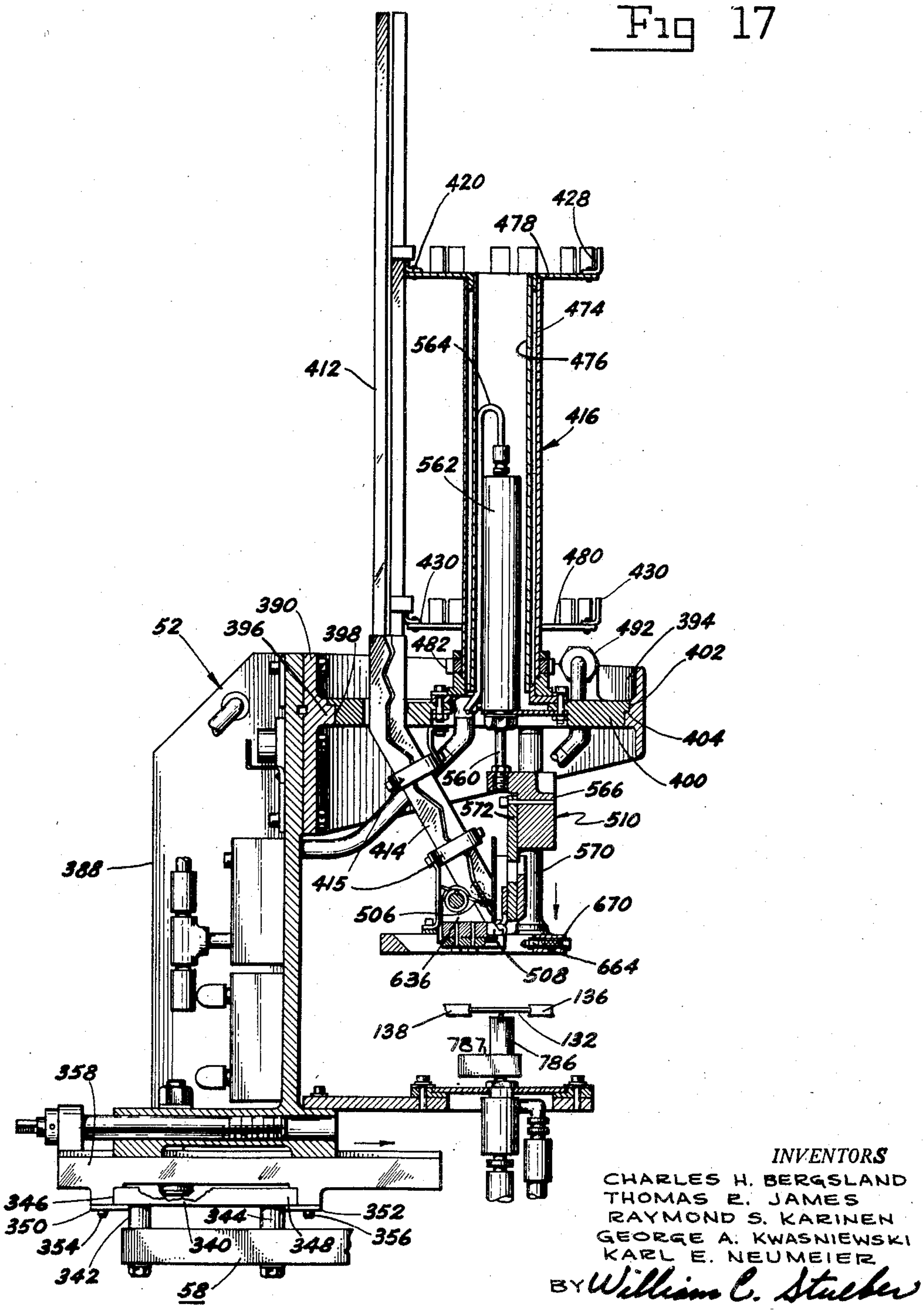

Fig. 17 is a side elevational view of the attaching head as it is located beside the conveyor, with a vertical section being taken through part of the head for clarity.

Figures 18, 19:
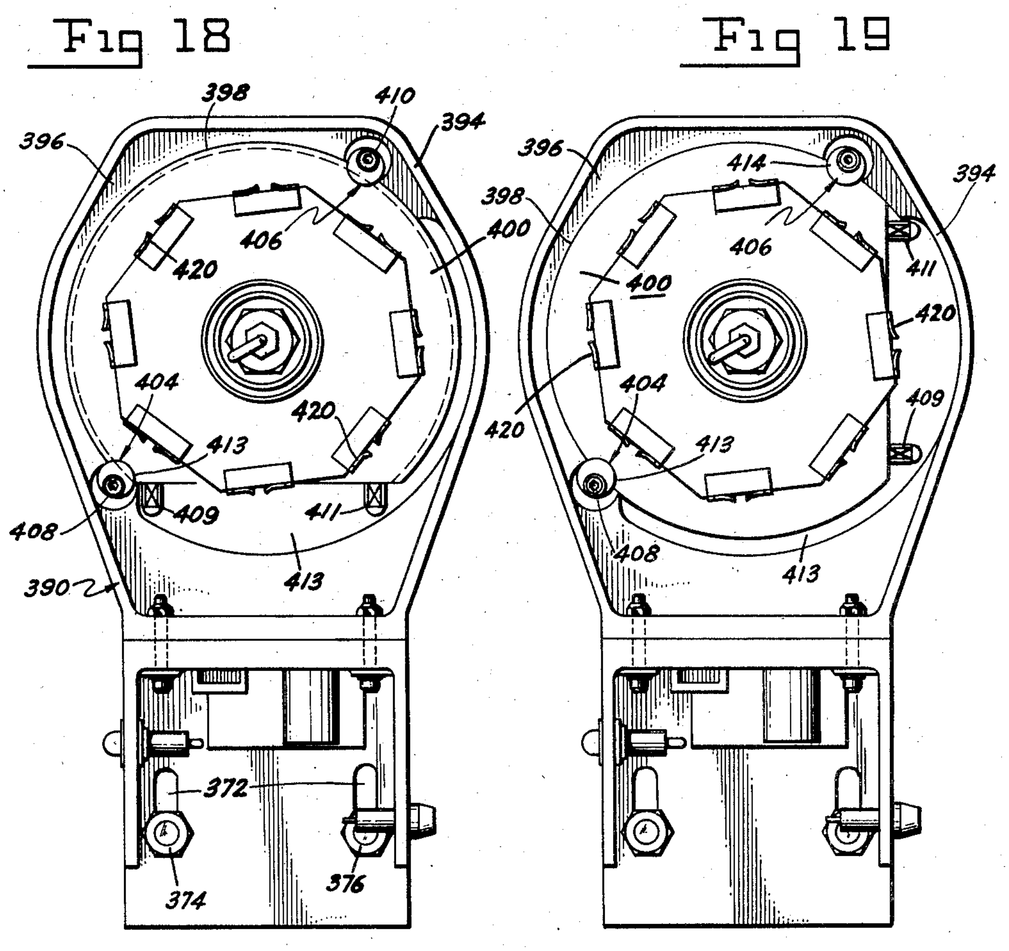

Figs. 18 and 19 are plan views of the attaching head with Fig. 19 illustrating the head as rotated at 90° from the position of Fig. 18.

Figure 20:
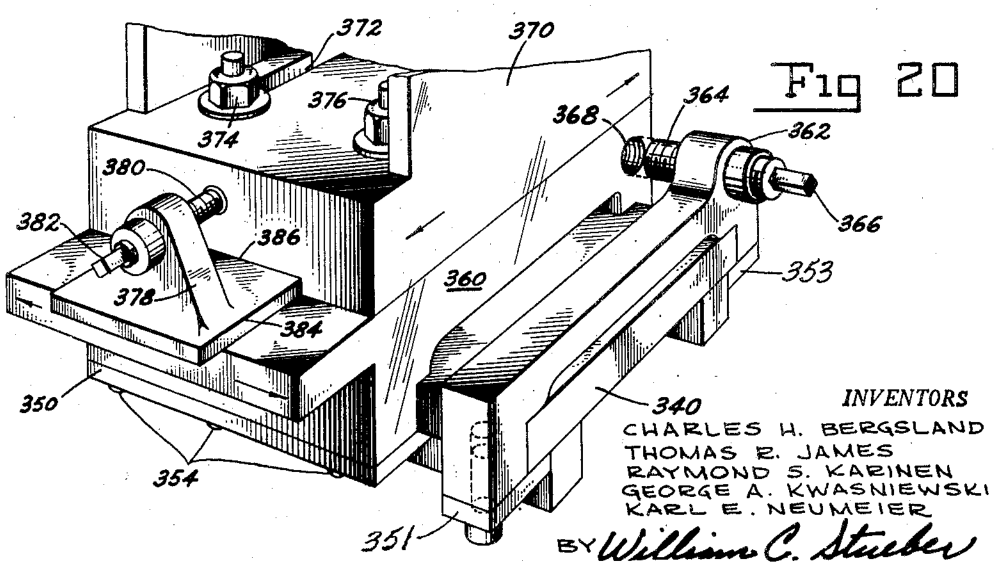

Fig. 20 is a perspective view illustrating the mechanism for adjusting the position of the attaching head with respect to the conveyor.

Figures 21, 22, 23, 24:
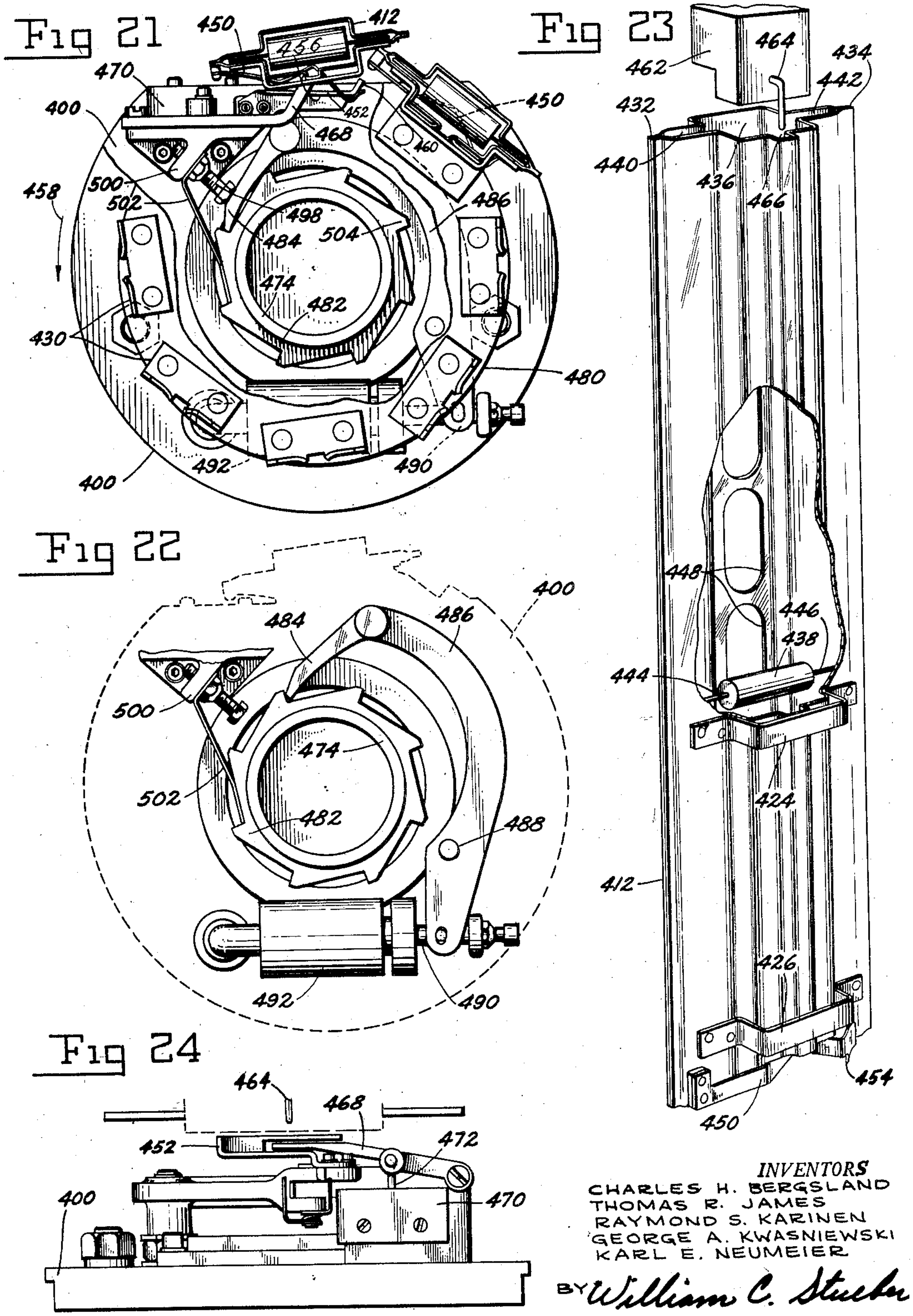

Fig. 21 is a plan view of the mechanism for indexing the magazines which supply the electrical components.

Fig. 22 is another view of the mechanism of Fig. 21 with portions of the mechanism removed to illustrate the operation of the indexing mechanism.

Fig. 23 is a perspective view of the magazine used for the electrical components.

Fig. 24 is an enlarged elevational view illustrating the position of the switch which detects when the electrical components in the magazine are exhausted.

Figures 25, 26, 27, 28, 29, 30:
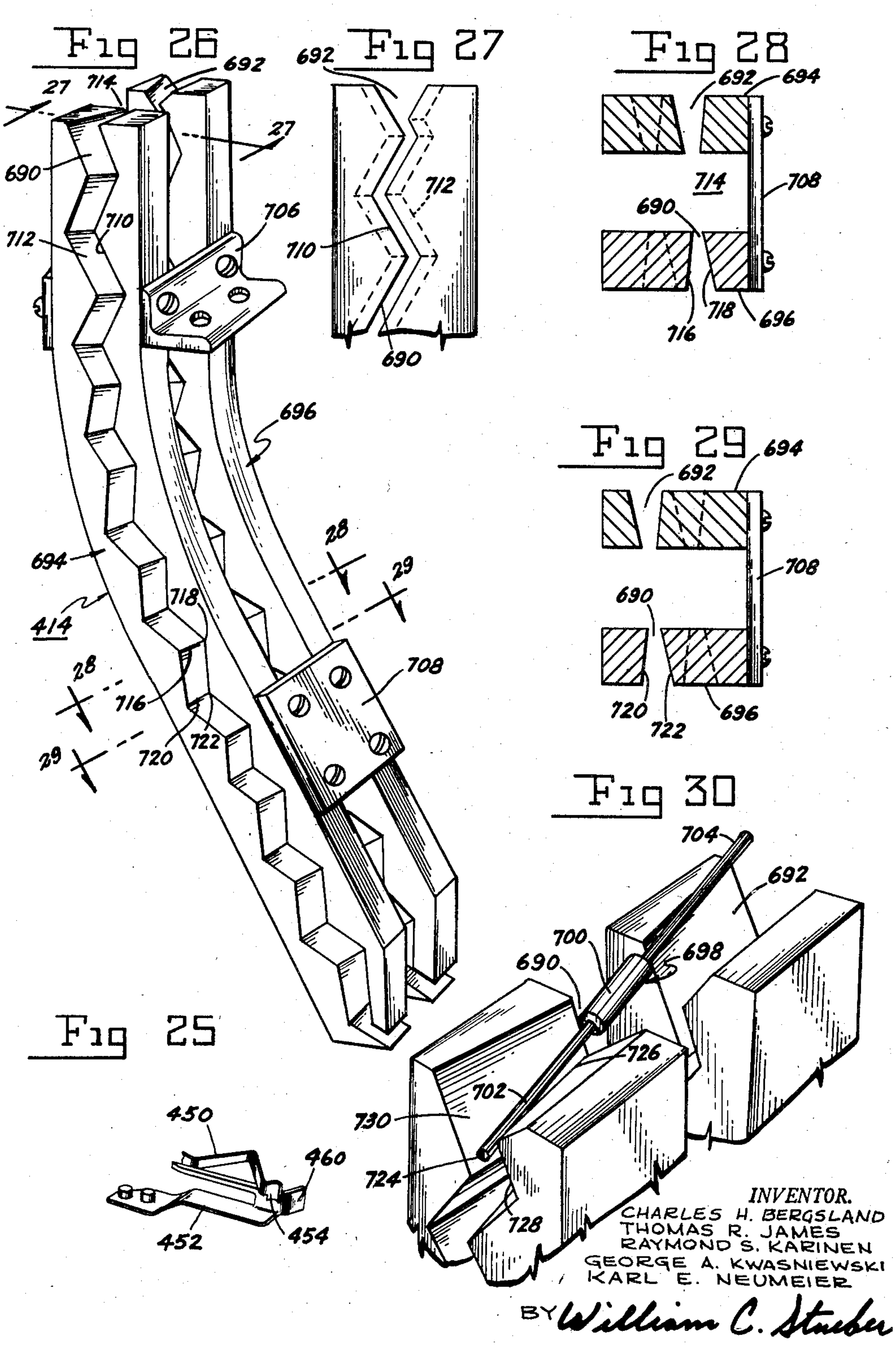

Fig. 25 is a perspective view illustrating the operation of the mechanism for releasing individual electrical components from the magazine when the magazine is brought into position for feeding components to the attaching head.

Fig. 26 is a perspective view of the feeder mechanism which aligns the position of the components and feeds them to the anvil where the leads are bent.

Fig. 27 is a sectional view taken along line 27—27 of Fig. 26.

Fig. 28 is a sectional view taken along line 28—28 of Fig. 26.

Fig. 29 is a sectional view taken along line 29—29 of Fig. 26.

Fig. 30 is a perspective view of the feeding mechanism of Fig. 26, illustrating its action in straightening the components.

Figure 31:
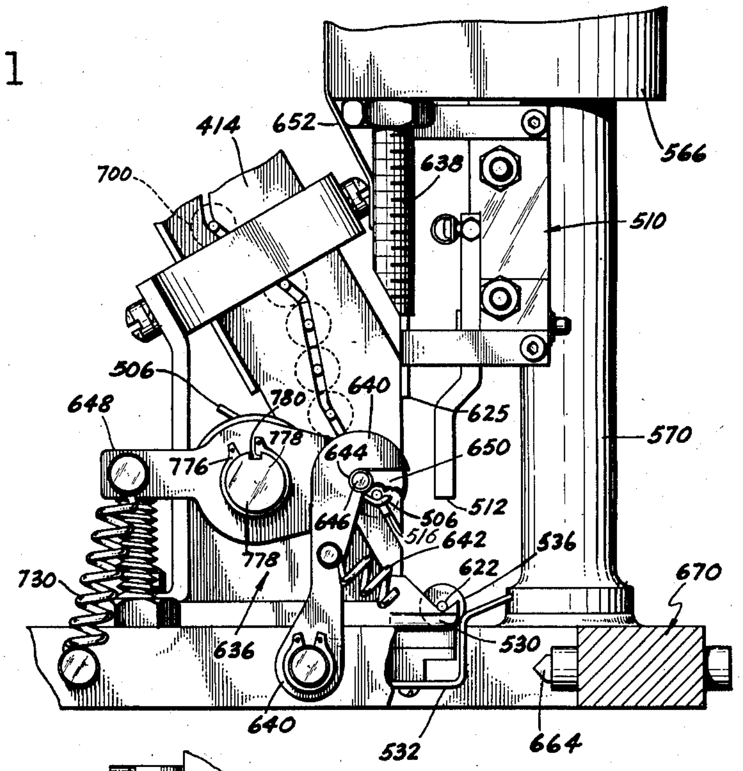

Fig. 31 is a side elevational view of a portion of the attaching head illustrating the mechanism before the inserter mechanism descends.

Figure 32:
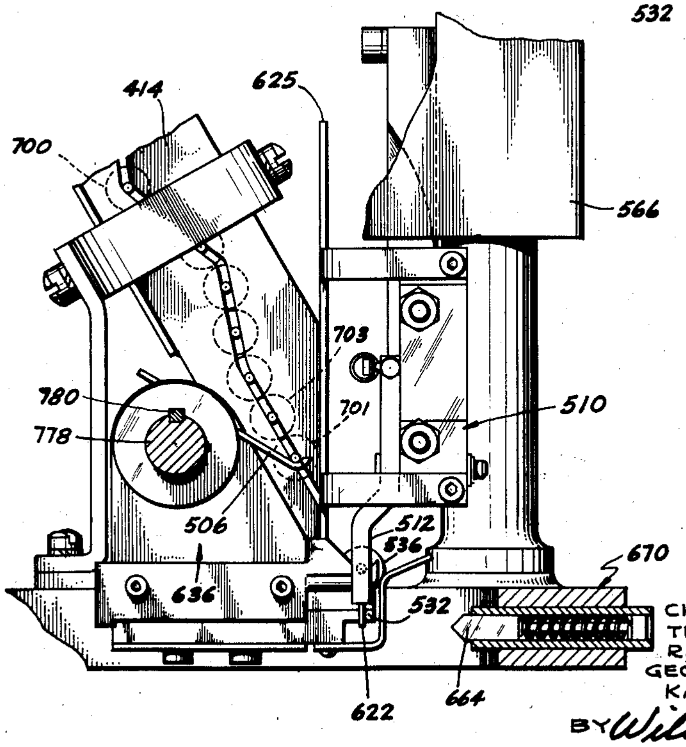

Fig. 32 is a side elevational view of the mechanism of Fig. 31 illustrating the inserter mechanism as it is descending and has bent the component leads.

Figures 33, 34:
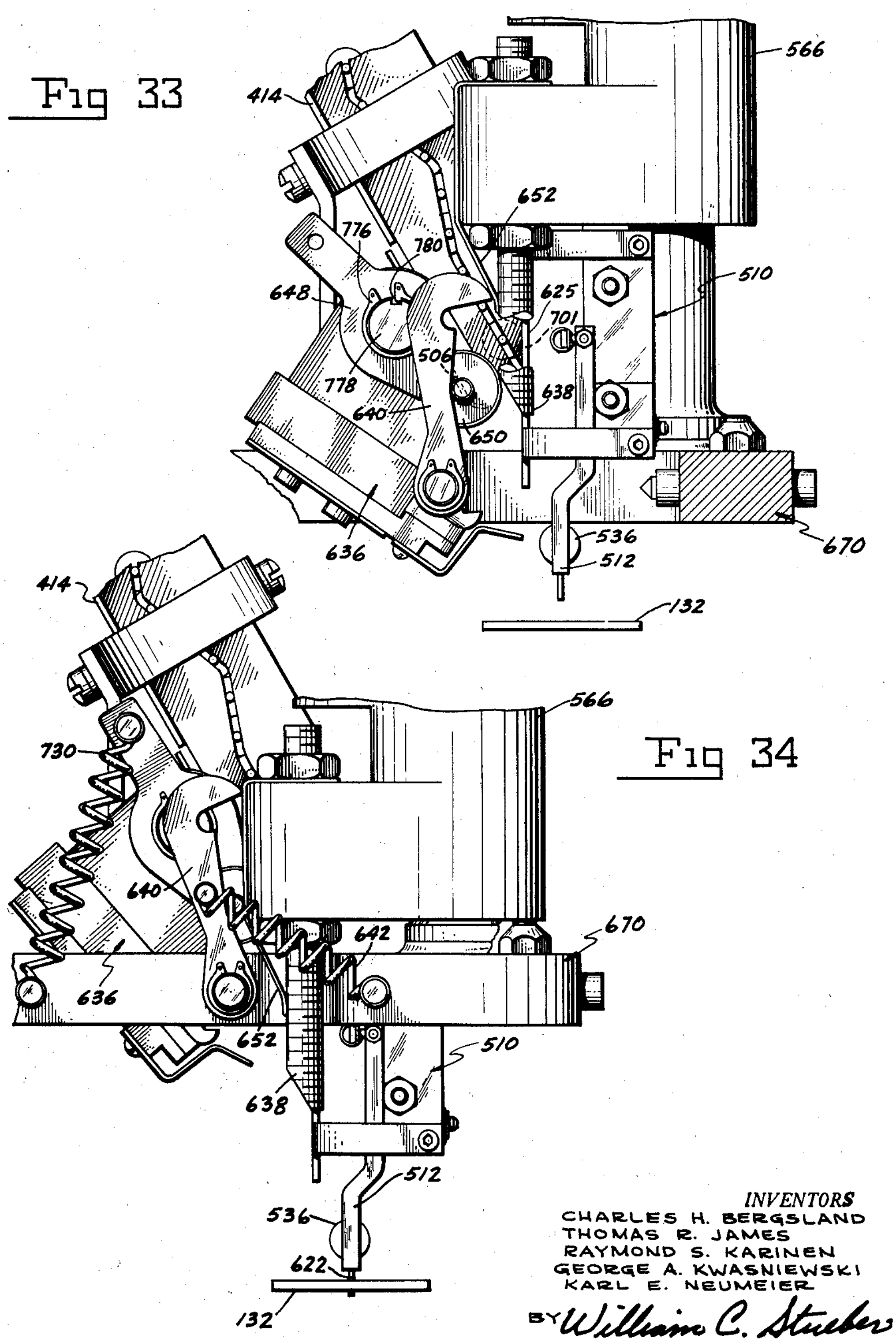

Fig. 33 is another view of Figs. 31 and 32, illustrating the manner in which the anvil is removed from the path of the descending inserter.

Fig. 34 is another view of Figs. 31, 32, and 33, showing the inserter having inserted the component leads into holes in the circuit board.

Figures 35, 36, 37:
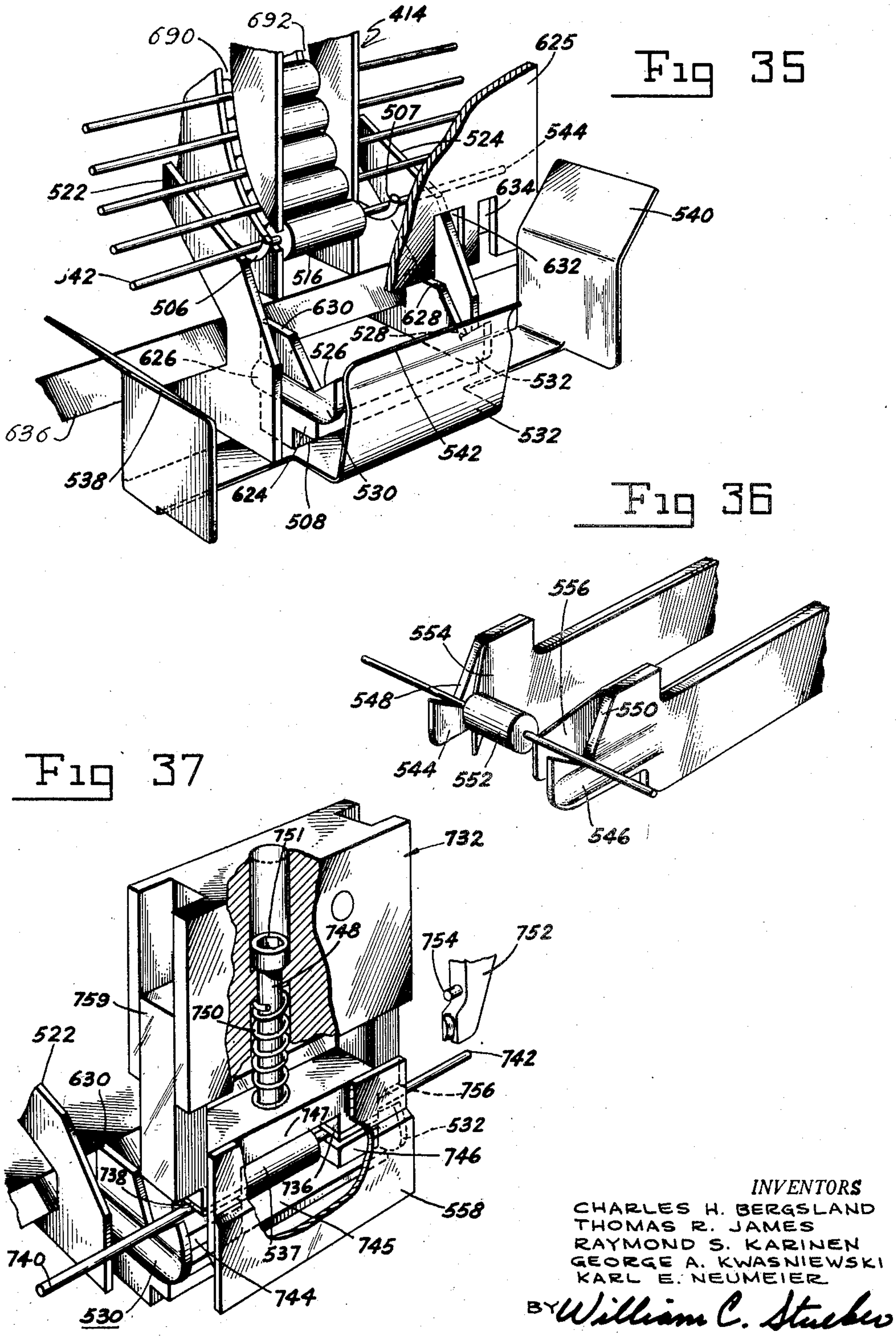

Fig. 35 is a perspective view of the mechanism for feeding and guiding the individual components to the anvil, certain portions of the component inserter mechanism being removed for clarity.

Fig. 36 is a perspective view of the anvil members shown in the form taken when very small electrical components are used.

Fig. 37 is an enlarged perspective view showing a form of inserter head which may be used with very small components.

Figure 38:
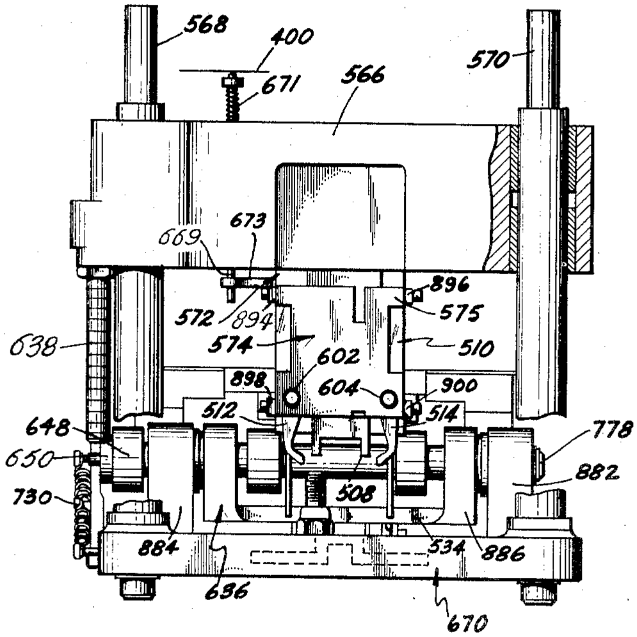

Fig. 38 is a front elevational view of a portion of the attaching head shown to illustrate the details of the inserter mechanism.

Figure 39:
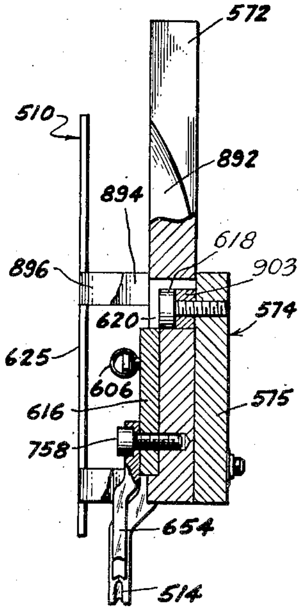

Fig. 39 is a side elevational view having portions broken away to illustrate the construction of the members of the inserting head.

Figure 40:
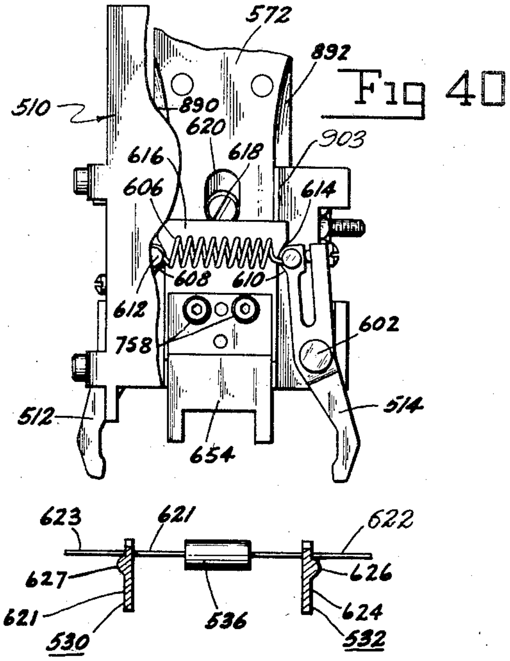

Fig. 40 is an enlarged rear elevational view showing the inserting mechanism before it has begun to descend.

Figure 41:
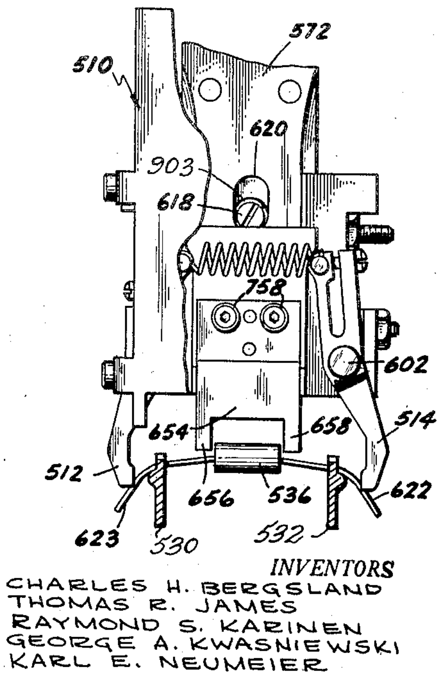

Fig. 41 is a rear elevational view of the mechanism of Fig. 40 showing the inserter beginning to bend the leads of the component.

Figures 42, 43, 44, 45, 46, 47, 48, 49:
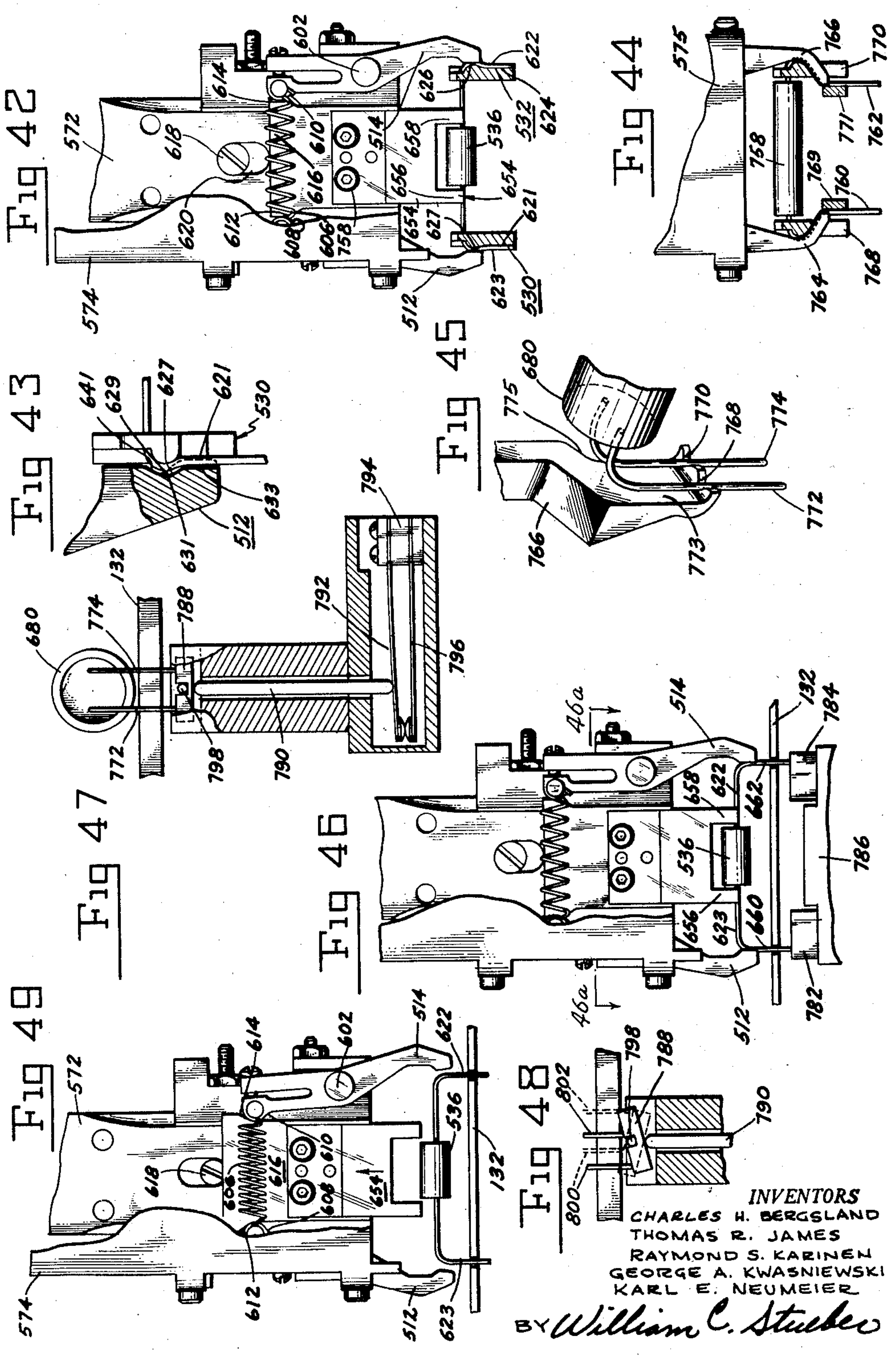

Fig. 42 is a rear elevational view of the inserter of Fig. 41 with the fingers having bent the component leads against the anvil sides.

Fig. 43 is an enlarged view taken in section through one finger to illustrate the relationship between the finger and anvil and to illustrate how the component leads are supported from the inserter finger.

Fig. 44 is a front elevational view showing alternative bending fingers which may be used in instances when the distance between the holes in the circuit board is less than the length of the component body.

Fig. 45 is a perspective view illustrating an alternative bending finger which may be used when a component having a double lead must be attached to the circuit board.

Fig. 46 is a rear elevational view of the inserter mechanism illustrating its position as it has inserted the component leads into the holes in the circuit board.

Fig. 46*a* is a cross sectional view of Fig. 46 taken at **46*a*—46*a***.

Fig. 47 is an elevational view illustrating a switch structure which is to be used when components having double leads are inserted into the board.

Fig. 48 is a perspective view illustrating the action of the switch of Fig. 47 when the component lead is improperly inserted.

Fig. 49 is a rear elevational view of the inserter showing its position as the component has been inserted and the fingers are spread with the inserter ascending to return position.

Fig. 50 is a side elevational view of the inserter showing its position when the component has been inserted into the board and the component is still gripped.

Fig. 51 is a sectional view of the mechanism of Fig. 50 illustrating the locking mechanism and its action after the inserter head has begun to ascend and the component has been released.

Fig. 52 is a perspective view of the circuit board illustrating several electrical components attached to the board.

Figure 53:
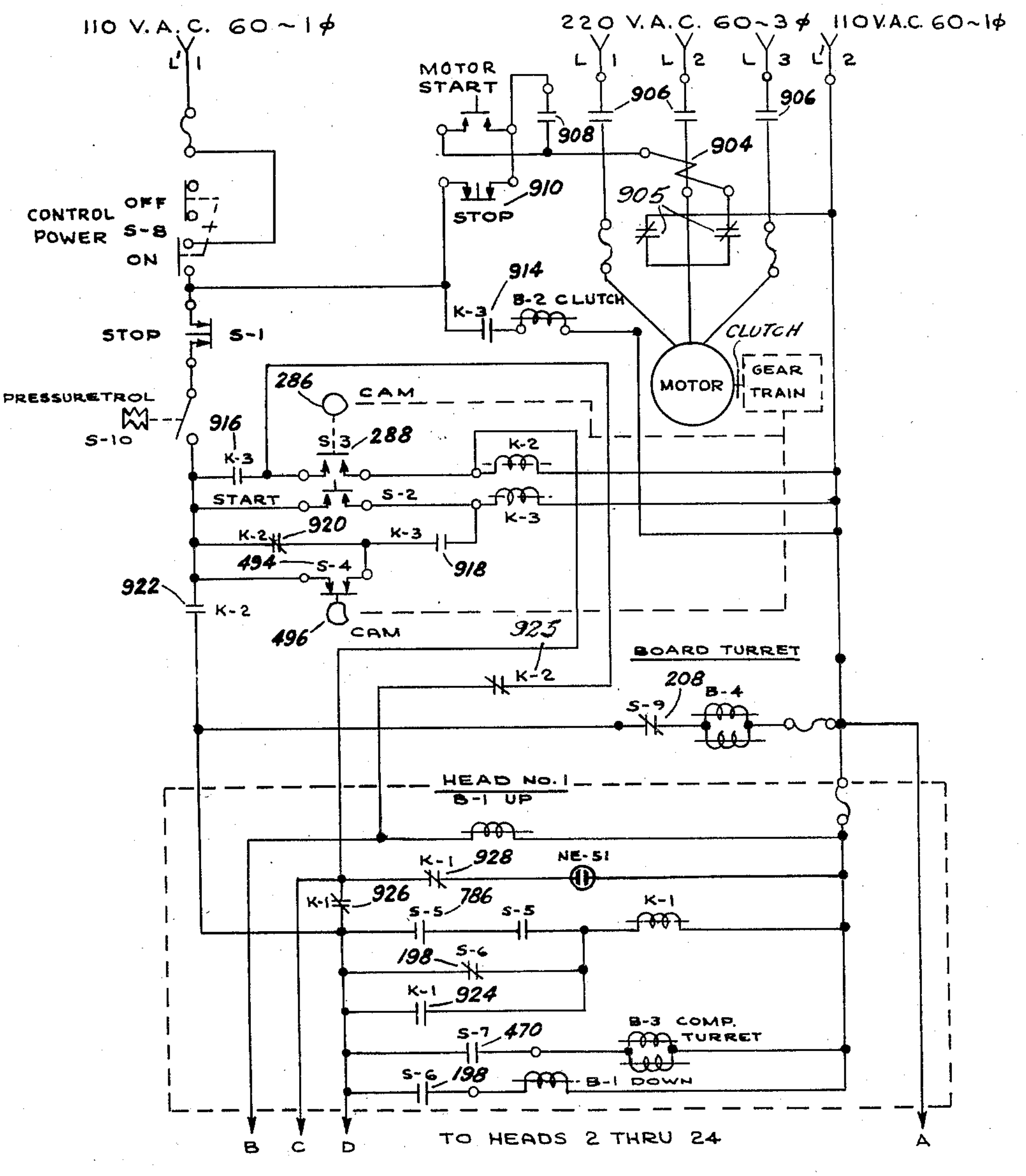

Fig. 53 is a diagrammatic view of the electrical circuitry used for the machine.

Figure 1:
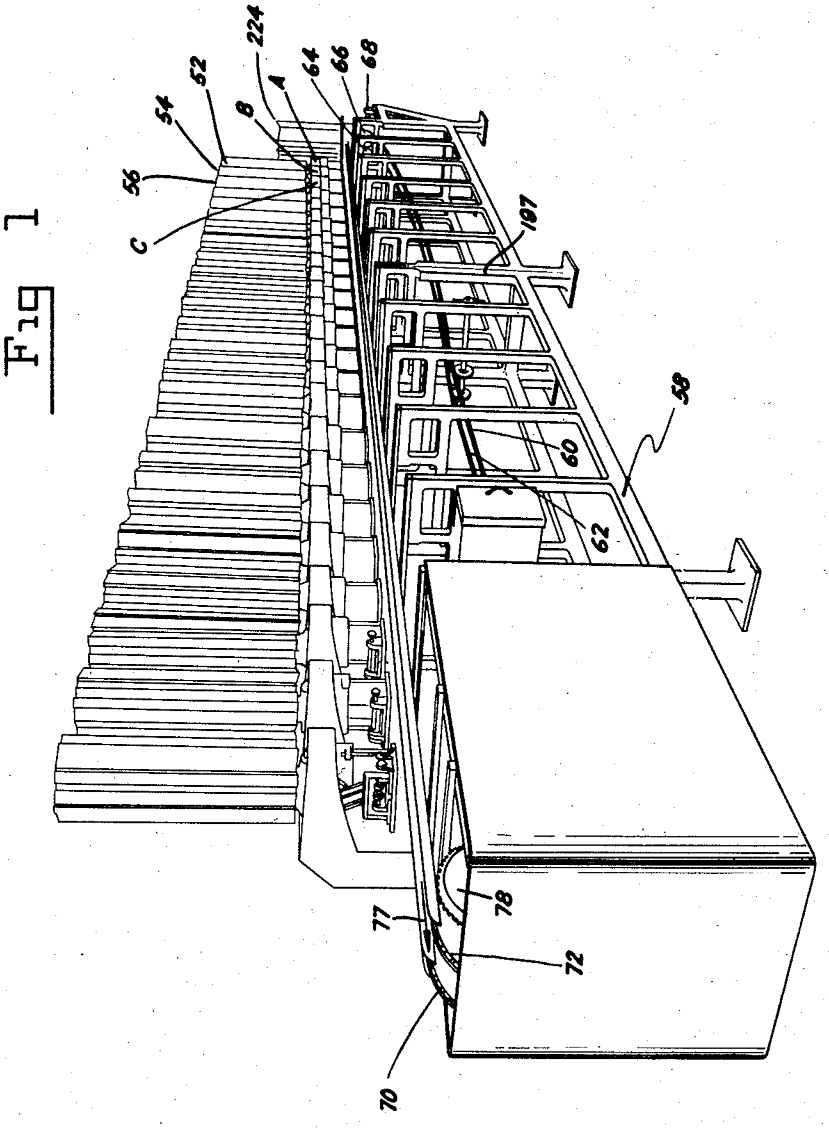
Figure 1 is a perspective view of the over-all machine taken from the front of the machine and illustrating the apparatus for conveying the circuit boards along a series of attaching stations with the attaching heads positioned at the stations.

The mechanism of the invention is shown in its preferred embodiment in Fig. 1 as capable of conveying a series of individual circuit boards along an assembly line. Along this line are a plurality of attaching stations, and at each station a different electrical component is attached to the circuit board in a different position. The circuit boards are cards or wafers which have electrical circuitry printed thereon with the circuit ends being marked by holes through the boards.

Electrical components are attached to the boards by having their ends bent to project toward the boards and having the ends inserted into the holes. The ends may then be crimped beneath the board or as in the illustration of the completed board 671 shown in Fig. 52, the leads 672, 674 of the component 676 may be fitted with sleeves such as illustrated at 678 for component 680. These sleeves wedge themselves into the holes 682. The sleeves will provide firm contact between the conducting areas of the circuit board and the leads of the electrical components. For greater security the circuit board may be further dipped in solder to insure a positive electrical connection. For the sake of simplicity of illustration, the electrical components are shown in many of the other drawings as having plain leads projecting into the holes without the small sleeves being attached to the ends of the leads.

Referring to Fig. 1, the first three attaching stations along the conveyor may be indicated at beginning stations A, B, and C with attaching heads indicated at 52, 54, and 56 for each of the stations. It will be seen from Fig. 1 that there are succeeding stations with a total of 24 attaching heads, with each station being provided with an attaching head.

The attaching heads are shown evenly spaced with one for each station of Fig. 1 but it will be understood and illustrated in connection with the description that the number of attaching heads may be varied in accordance with the number of components to be attached to the circuit board. That is, if fewer components are to be attached to the board any number of heads may be removed from the machine and at these stations no components will be attached to the board.

Further, the positions of the attaching heads may be adjusted with respect to the attaching stations so that an electrical component may be attached by any head in any position on the board without varying the position of the board on the conveyor. Also, the rotational position of each of the heads may be altered so that the orientation of any of the components may be changed with respect to the board and the component may be mounted at any angle with respect to the board. Thus the machine may be quickly adapted to handle any given board by merely properly adjusting the number and position of the attaching heads.

The circuit board illustrated in Figure 52 shows the change in position and orientation which is accomplished. Component 676 is longitudinal of the board, component 680 is lateral, and component 681 is at an angle.

It will further be seen in connection with the description of the machine that the type of component handled by the attaching heads may be changed at random. With this adaptability, an infinite number of combinations of circuits may be assembled regardless of the type, size, or position of components which must be assembled on the circuit board.

Figure 2:
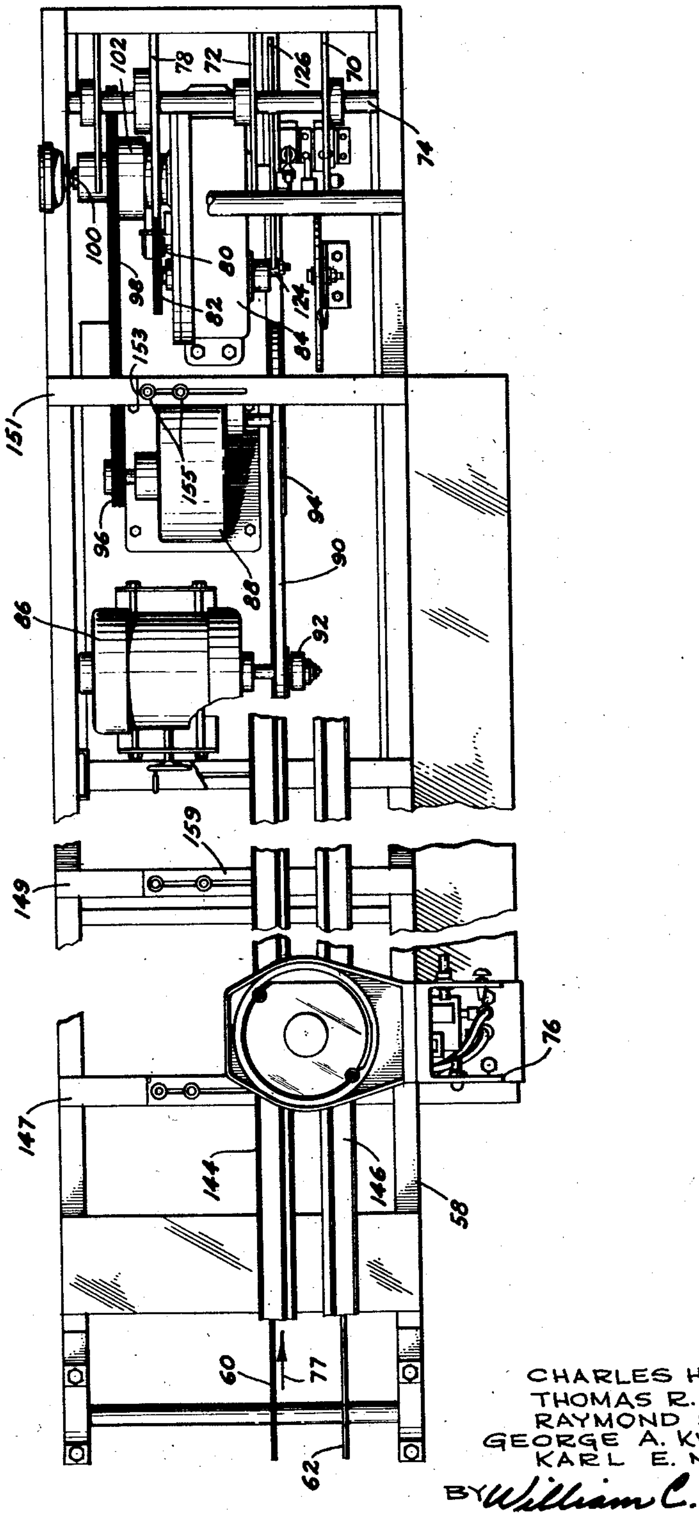
Fig. 2 is a plan view showing the arrangement of the machine with parts of the mechanism removed or broken away to better illustrate the operation of the mechanism for driving the conveyor.
Figure 3:
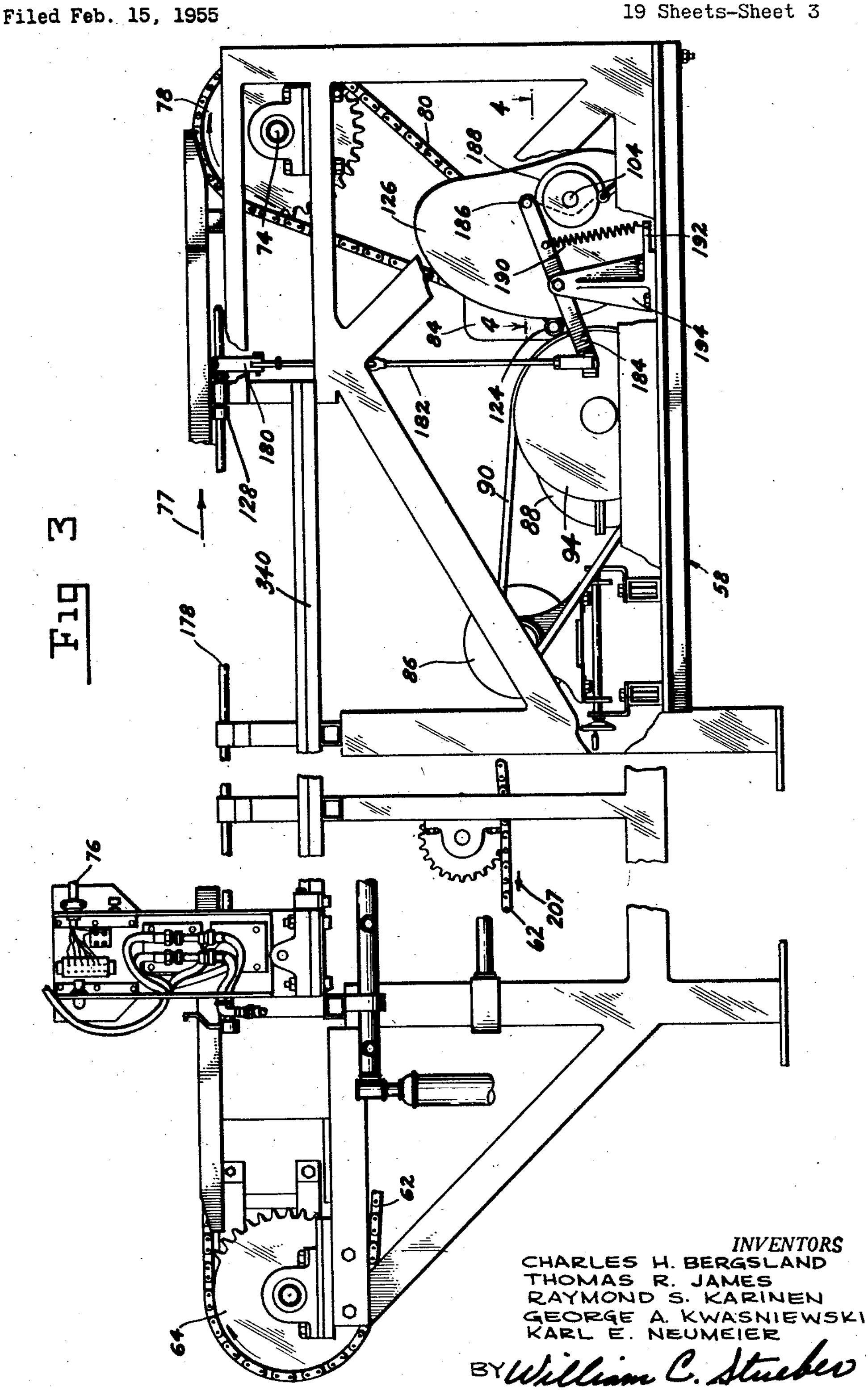
Fig. 3 is a side elevational view of the machine taken from the back side and having certain portions removed to illustrate the operation of the apparatus for driving the conveyor.

The machine as a whole, Figs. 1, 2, and 3, includes a main framework 58. This framework supports the conveyor chains 60 and 62 and the individual attaching heads represented by 52, 54, and 56 in Fig. 1 and 76 in Figs. 2 and 3.

For purposes of description, the machine will be described in sections, and each portion of the description describing a section will be headed with the name of the section described, i.e., the conveyor and drive mechanism, the board feeder, the circuit board positioning mechanism, the attaching head, the component feeder, etc.

*The conveyor and drive mechanism*

The conveyor chains 60 and 62 which carry the circuit boards through the machine along the series of attaching stations pass over sprockets at each end of the machine. At the receiving end where the incomplete circuit boards are dropped on the conveyor, the sprockets are shown at 64 and 66 and are carried on a shaft 68 which is rotatably supported by the framework of the machine. At the discharge end where the completed circuit boards are discharged, the sprockets, over which pass the conveyor chains, are shown at 70 and 72. These sprockets are supported on shaft 74 and the conveyor is driven from this end so that the top portions of the chains will be drawn taut.

Whereas Fig. 1 is shown facing the machine, Fig. 3 is shown from the back of the machine looking at the back of the inserter heads with only one head 76 being illustrated in Figs. 2 and 3 for the sake of simplicity of illustration. The arrow 77 of Figs. 1–3 indicates the direction in which the circuit boards move through the machine and will aid in orientation of these figures.

The conveyor chain shaft 74 carries a drive sprocket 78 over which passes a drive chain 80. This chain 80 is driven by sprocket 82, the sprocket being hidden by the gear case 84 in Fig. 3, but being shown in Fig. 2.

Figure 4:
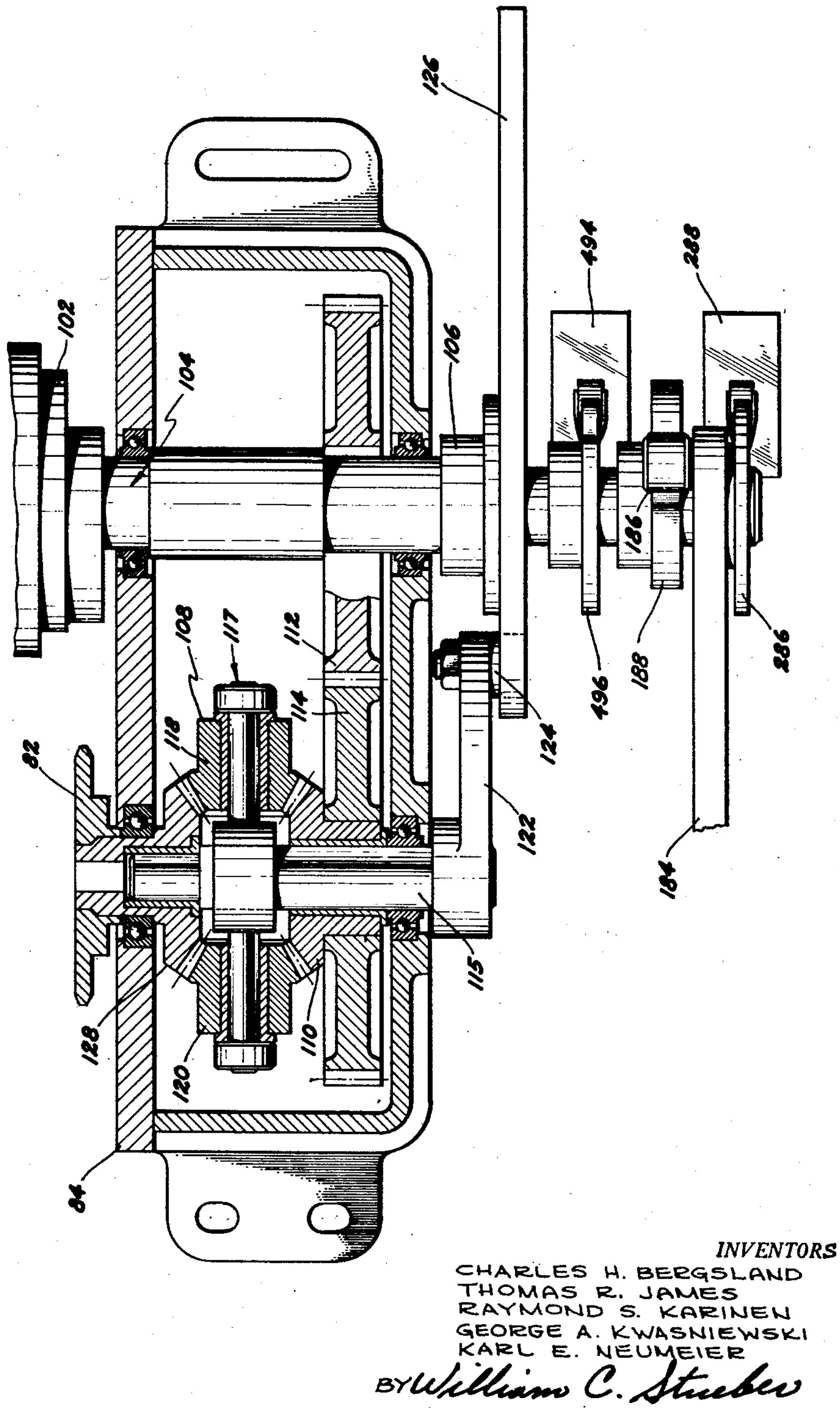
Fig. 4 is a sectional view taken along line 4 of Fig. 3 which extends through the differential gear case to illustrate the mechanism for driving the conveyor.

The gears within the gear case are shown in detail in Fig. 4 and operate to transform the constant rotary motion of the drive motor 86 into a special intermittent movement to stop the circuit boards at each attaching station as they are moving through the machine.

The power is transmitted from the motor 86, Figs. 2 and 3, to a reduction gearing 88 by means of a V-belt 90 leading from the pulley 92 on the motor shaft to pulley 94 on the input shaft in the gear box 88. The pulley 96 on the output shaft of the gear box carries belts 98 which pass over a pulley on the input shaft 100 which leads through a clutch 102 to the special gearing within the box 84.

The clutch 102, Figs. 2 and 4, may be employed to shut down the machine without stopping the drive motor 86. This clutch acts as a safety device and automatically disengages to stop the machine if a component is improperly attached or if a component fails to be attached to the circuit board at any one of the stations as will be shown in connection with the description of the wiring diagram of Fig. 53.

The clutch 102 drives a shaft 104 passing into the special gear box and this main shaft also carries a number of cams at its other end 106. Within the gear box, Fig. 4, is carried a differential gearing 108. The differential 110 is driven through gears 112 on the main cam shaft 104 and a gear 114 secured to the drive gear 110 which comprises one side of the differential gear. Gears 114 and 110 are freely mounted on shaft 115 which passes through the center of the differential gearing and to which is secured the differential spider 117 which supports the beveled pinions 118 and 120.

To shaft 115 also is secured a crank arm 122 which has a follower 124 riding on a cam 126. It will be apparent that as long as shaft 115 is locked to prevent the spider 117 from rotating the drive gear 110 will drive the pinions 118 and 120 which drive gear 128 on the opposite side of the differential. Bevel gear 128 drives sprocket 82 which carries the chain 80 to drive the conveyor.

With the above described drive, power is transmitted from the motor through the clutch, through the differential and up to the conveyor. The intermittent movement of the conveyor is obtained by the shape of the cam 126 which controls the movement of the follower arm 122. The cam 126 is shown in Figs. 2, 3, and 4, rotating with the shaft 104. Thus as the cam 126 rotates, the arm 122 will be caused to pivot as the follower 124 moves from the high to the low spots of the cam. Pivotal movement in one direction will rotate the spider 117 in one direction to drive the gear 128 forward and pivotal movement in the other direction will cause this gear to stop. The arrangement of the cam 126 being constantly rotated on shaft 104 is such that the motion of the drive gear 110 will be completely compensated for by the movement of the differential spider 117 in the same direction. When the spider rotates in the opposite direction, the gear 128 will be driven forward and the conveyor will be driven forward. Thus for a portion of the rotation of the drive gear 110 the conveyor is not driven but remains stationary. Then as the follower 124 moves on to a high spot on the cam 126, the conveyor will again be driven ahead. The cam is so shaped that the conveyor chain will accelerate after leaving the high spot on the cam and decelerate at a uniform rate.

Thus as the large cam 126 rotates, the conveyor chains 60 and 62 move ahead to carry a circuit board to an attaching station and then pause for a period to permit an electrical component to be attached to the board. When the component is attached, the conveyor chain again moves ahead to move a circuit board to a succeeding station.

The operation of the attaching heads and of the component feeding turret and board feeding turret is controlled by the cam 286 on the shaft 104 which operates electrical switch 288 so that the heads are operated in synchronism with the movement of the conveyor chain. The head will perform its operation to attach an electrical component to the board during the period of time when the board is stopped in front of it at the attaching station. Switch 494 operated by cam 498 on shaft 104 is a failure detection switch which will function to disengage clutch 102 to shut down the machine if a component is not attached. This operation will be described in connection with Fig. 53.

*The circuit board positioning mechanism*

Although the boards stop at each attaching station, it is imperative that the position in which they stop be accurate to a very high degree. This is because the holes in the circuit board are small and when the electrical components are brought down against the board, the position of the holes must be fixed and certain so that the tip of the lead will enter the hole. If the circuit board is not accurately located, the lead will engage the board surface beside the hole and will bend, damaging the component and spoiling the attachment.

Figures 6, 7:
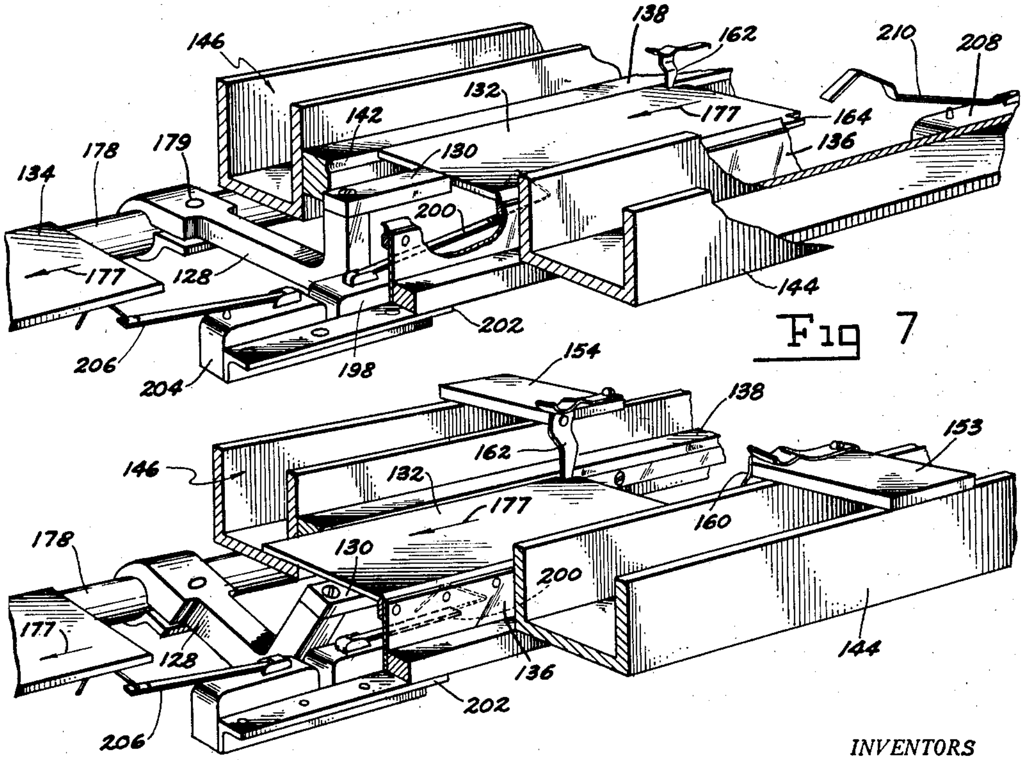
Figs. 6 and 7 are perspective views of a short section of the conveyor illustrating how the circuit boards are stopped and again moved forward at the component attaching stations.

For accurately positioning the board at each attaching station, stop arms 128 are provided having heads 130, Figs. 6 and 7. The stop heads engage the leading edge of the circuit boards 132 as shown in Fig. 6 to stop them in position at the attaching station. The conveyor of course also stops but it pushes the boards tightly against the stops. To release the board, the stop head 130 is pivoted out of the path of the board to the position shown in Fig. 7. The stop arm 128 makes the pivotal movement for each circuit board and stops and holds the board while the inserting member is descending on the board to insert the leads of the electrical component. In Fig. 6 the stop arm 128 is shown stopping the board 132 while the preceding board which has left the station is positioned at the next succeeding station.

Figure 5:
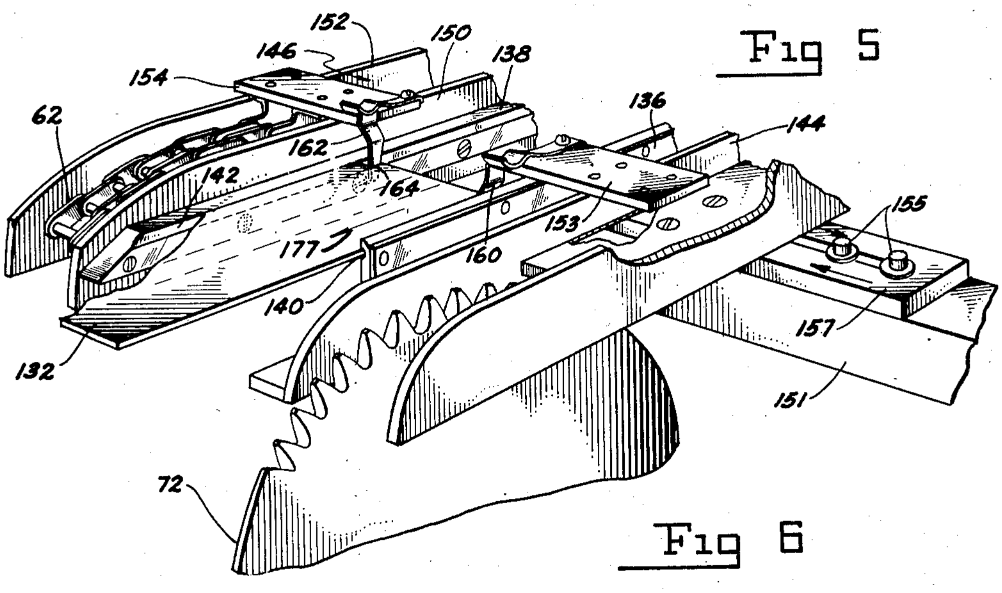
Fig. 5 is a perspective view of the discharge end of the conveyor illustrating the manner in which circuit boards are conveyed through the machine.

While the position of the boards parallel to the path of the conveyor is important, their lateral position is also important so that the holes will be properly positioned in all directions. For this lateral positioning, the boards are guided between guide members 136 and 138 as shown in Figs. 5 to 8. In Fig. 5 the discharge end of the machine is shown with the guide members provided with grooves 140 and 142 in which slide the outer edges of the board 132. The guides 136 and 138 are supported on the channels 144 and 146 which support the conveyor chains. These channels are provided with sides 150 and 152 as is shown in the case of channel 146 in Figs. 5 and 8.

The chain guiding channel 144, on the right side of the machine as viewed in Fig. 5 or on the front side of the machine as viewed in Fig. 2, is adjustably secured to the supporting cross bars 147, 149, and 151. This permits adjustment of the space between the channel 144 and the channel 146 so that circuit boards of different sizes can be taken by the machine. Adjustment of the position of the channel 144 also adjusts the spacing between the guides 136 and 138 so that the board will fit snugly therebetween. The channel 144, as shown in Fig. 5, is mounted on a sliding plate 157 which is secured to the horizontal support 151 by bolts 155. Another sliding plate is shown at 159 in Fig. 2 as bolted to support 149. The sprocket wheels 66 and 72 which serve the conveyor chain 60 on the front side of the machine are adjustable in position along their supporting shafts so that the distance between the conveyor chains 60 and 62 may be readily adjusted.

Figures 8, 9, 10:
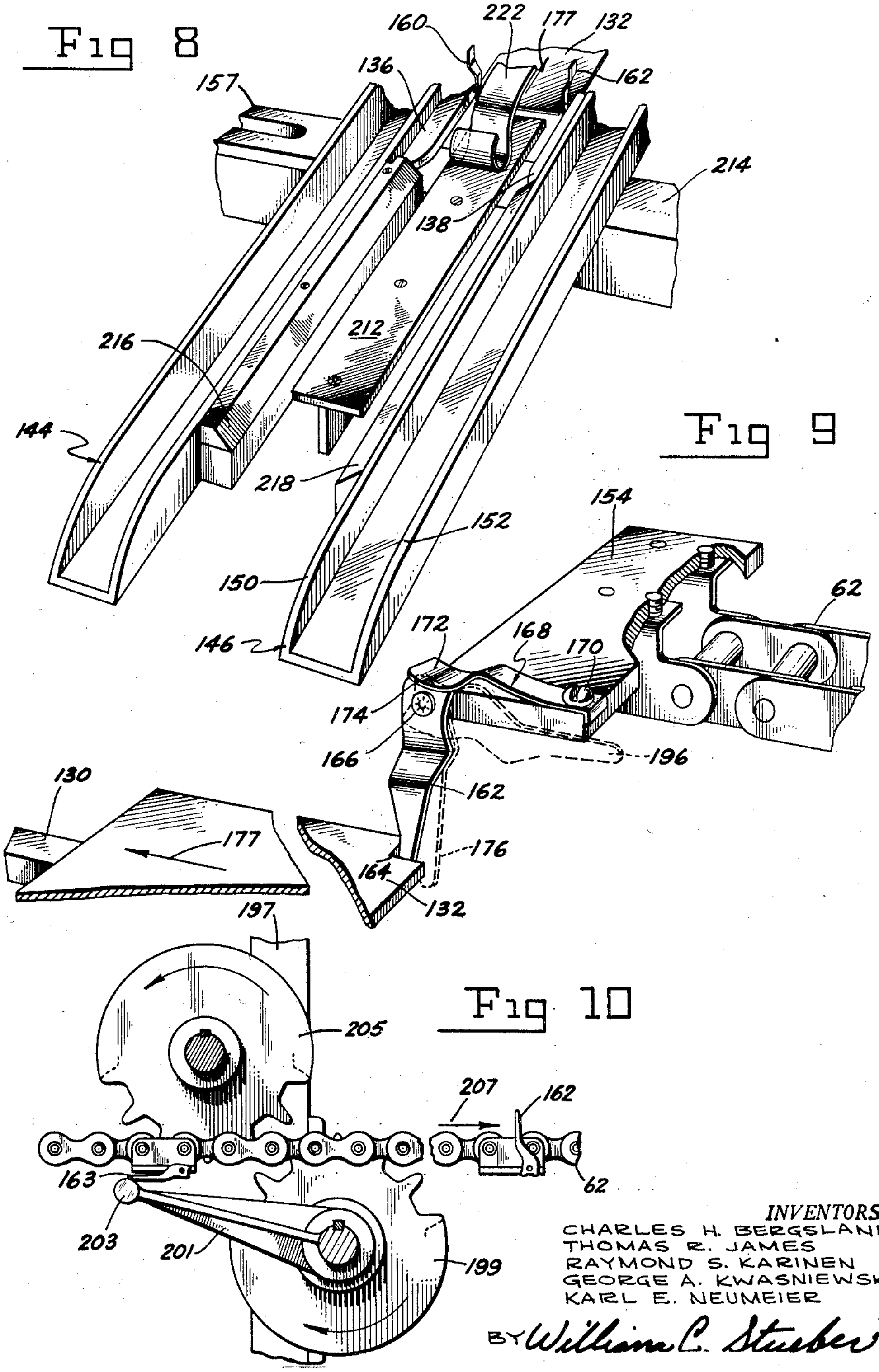
Fig. 8 is a perspective view of the receiving end of the conveyor.
Fig. 9 is an enlarged perspective view illustrating the action of the fingers which push the circuit boards between the conveyor guides.
Fig. 10 is a perspective view of the device for resetting the fingers after they have been tripped or moved to non board-engaging position.

The plate 154 which is attached to the chain 62 in Fig. 5 or the plate 153 is attached to chain 60 and carries the pusher fingers 160 and 162 which engage the rear edge of the board to push it between the guides 136 and 138 along the conveyor. The board 132 is shown in Figs. 5 and 9 having notch 164. The finger engages the board at the notch but would engage the rear edge of the board if a completely rectangular board were used.

The pusher finger 162 is shown in greater detail in

Fig. 9. It will be there noted that the finger is pivotally mounted on its supporting plate 154, the pivotal mounting being indicated at 166. The finger is held in its vertical downwardly projecting position by a leaf spring 168, which is firmly secured to the plate 154 by a screw 170. The leaf spring has a curved end 172 which presses downwardly against the upper curved surface 174 of the finger 162.

Thus, the spring 168 causes the finger to resist rearward movements so that as it moves slightly backward as to the dotted line position 176 of Fig. 9, it is under tension and biases the circuit board 132 forward.

With this arrangement, the stop head 130 is caused to swing into the path of the board before the board reaches the attaching station as shown in Fig. 9. It is positioned to be engaged by the board before the conveyor chains come to a complete stop. Thus the slight overtravel of the conveyor chain 62 which it is designed to have, as shown in Fig. 9, will cause the pusher finger 162 to be forced rearwardly to the dotted line position 176. Thus the finger pushes the board tightly against the stop head 130. In this manner the board will be firmly and accurately positioned in accordance with the position of the head 130. This position may be adjusted by loosening the screw 179, Fig. 6, which clamps the arm 128 to the shaft 178.

The movement of the stop head 130 into the path of the board is controlled by the pivotal movement of the supporting arm 128 which is secured to the shaft 178 as illustrated in Figs. 6 and 7. This shaft is operated in synchronism with the conveyor chain as will be discussed in connection with Fig. 3.

In Fig. 3 the rod 178 which carries the stop arm and the stop head 130 is shown extending the length of the machine. Although only one stop arm and head is shown in Figs. 3, 6, and 7, an arm is provided for each of the attaching stations along the machine. Thus a card is stopped at each attaching station when the stop arms are pivoted to stop positions by the rotation of the shaft 178.

To pivot the shaft 178 and to operate the stops in synchronism with the conveyor, the shaft carries a crank arm 180, Fig. 3. A connecting rod 182 connects this arm to a rocker arm 184. This rocker arm carries at its end a cam follower 186 which bears against cam 188, the cam being carried on the cam supporting shaft 104 shown in Figs. 3 and 4. The follower 186 is held against the cam by a tension spring 190 connected between the rocker arm 184 and a bracket 192 which is suitably mounted on the frame 58. The rocker arm 184 is pivotally mounted on a bracket 194 which forms part of bracket 192 and which is supported on the frame 58.

Thus as cam 188 rotates with the shaft 104, the follower 186 will permit the rocker arm 184 to rotate the shaft 178 to move the stop arms 128 into position to stop the circuit boards, and out of position to permit the boards to move forward. The arms will be pivoted out of the path of the boards just before the conveyor starts to move so that the pusher fingers 160 and 162 will be free to move the board forwardly.

In some instances, the pusher finger 162 may be accidentally snapped to its rearward position as shown by the dotted line position 196 of Fig. 9. This position for the pusher finger is provided so that the finger may be moved above the path of the board so that the finger will not be damaged in the event that its path is blocked by an immovable object.

*Finger resetting mechanism*

If the finger should accidentally be pushed to this recessed non-pushing position 196, it will be reset automatically to full line position 162 for the next travel which it makes through the machine. The finger 162 and its holding spring 168 are so constructed that in case the board encounters an obstacle the finger will be pushed rearwardly and if pushed back too far, will snap back to the retracted position 196 rather than drag against the surface of the board to perhaps scratch the board and damage the printed circuit thereon. Similarly the finger can be returned to pushing position by rotating the finger back to its normal position and this is accomplished by a finger resetting mechanism shown in detail in Fig. 10.

The sprockets 199 and 205 which are included in the operative portion of the resetting mechanism are mounted on a vertical member 197 which is a part of the main frame 58. The position of member 197 is illustrated in Fig. 1 where the finger resetting mechanism has been omitted from the drawing as have other details for the sake of clarity of that figure. A first sprocket 199 is rotatably supported on the frame member 197 and the conveyor chain 62 rides over the sprocket to rotate it. The sprocket carries a resetting arm 201 which rotates with the sprocket and has a resetting pin 203 carried at its end. The sprocket is designed with the correct diameter and number of teeth so that it will make one complete rotation each time a resetting finger such as 162 and 163 passes it.

The crank arm and resetting pin are so positioned that as the pin 203 passes the chain 62 (Fig. 10) they will engage the pusher finger 163 if it is in the folded position. This is the position illustrated at 196 in Fig. 9. As the pin 203 engages the finger it pivots it upwardly to reset it to its original position where it projects at right angles to the chain which is the position illustrated by finger 162 in Fig. 10.

Another idler sprocket 205 is positioned above the chain to hold it down so that the pin 203 striking the pusher finger will not merely raise the chain but will reset the finger. Sprocket 205 is also rotatably supported on member 197 and its sprocket teeth engage the conveyor chain 62. Its size is not material but to reduce cost of manufacture it may be of the same size as sprocket 199. The arrow 207 shows the direction of movement of the chain 62.

Thus it will be seen that the arm 201 is swung past the conveyor chain 62 once for each pusher finger which passes the resetting mechanism of Fig. 10. If the finger is in the proper position as shown by finger 162, the resetting pin 203 will pass by the finger and not engage it. If, however, the finger has been tripped and is in the folded position, the finger 203 will strike it and flip it back to the reset position.

*No-board safety mechanism*

As the conveyor stops for each attaching station, there is a circuit board opposite each of the attaching heads. Each of the heads attaches a certain component to the board. In many instances, the component attached from one succeeding head to the other will be different so that as the board completes travel through the machine, it will have the required number of different electrical components attached.

To prevent possible machine damage and jamming and to prevent wasting electrical components, if for some reason a board is absent from one of the positions on the conveyor, the attaching head will not function at that station. For this purpose a switch is positioned at each station. As illustrated in Fig. 6, switch 198 has an arm 200 extending into the path of the circuit board 132. When the circuit board 132 is stopped in attaching position at the station as shown in Fig. 6, the switch arm 200 is depressed to close the circuit and permit the attaching head to operate. If the switch arm is not depressed, the circuit will remain open and the head will not operate as will later be described in detail in connection with the description of the head and the circuit diagram of Fig. 53.

The switch 198 is suitably mounted on a bracket 202 which is suitably supported from the channel 144 carrying the conveyor chain. To simplify construction, the switch 204 which is for the next station, is mounted on the same bracket and has its arm 206 extending in the opposite direction with the arm positioned so that it will be depressed by the board 134 at its attaching station.

Figure 11:
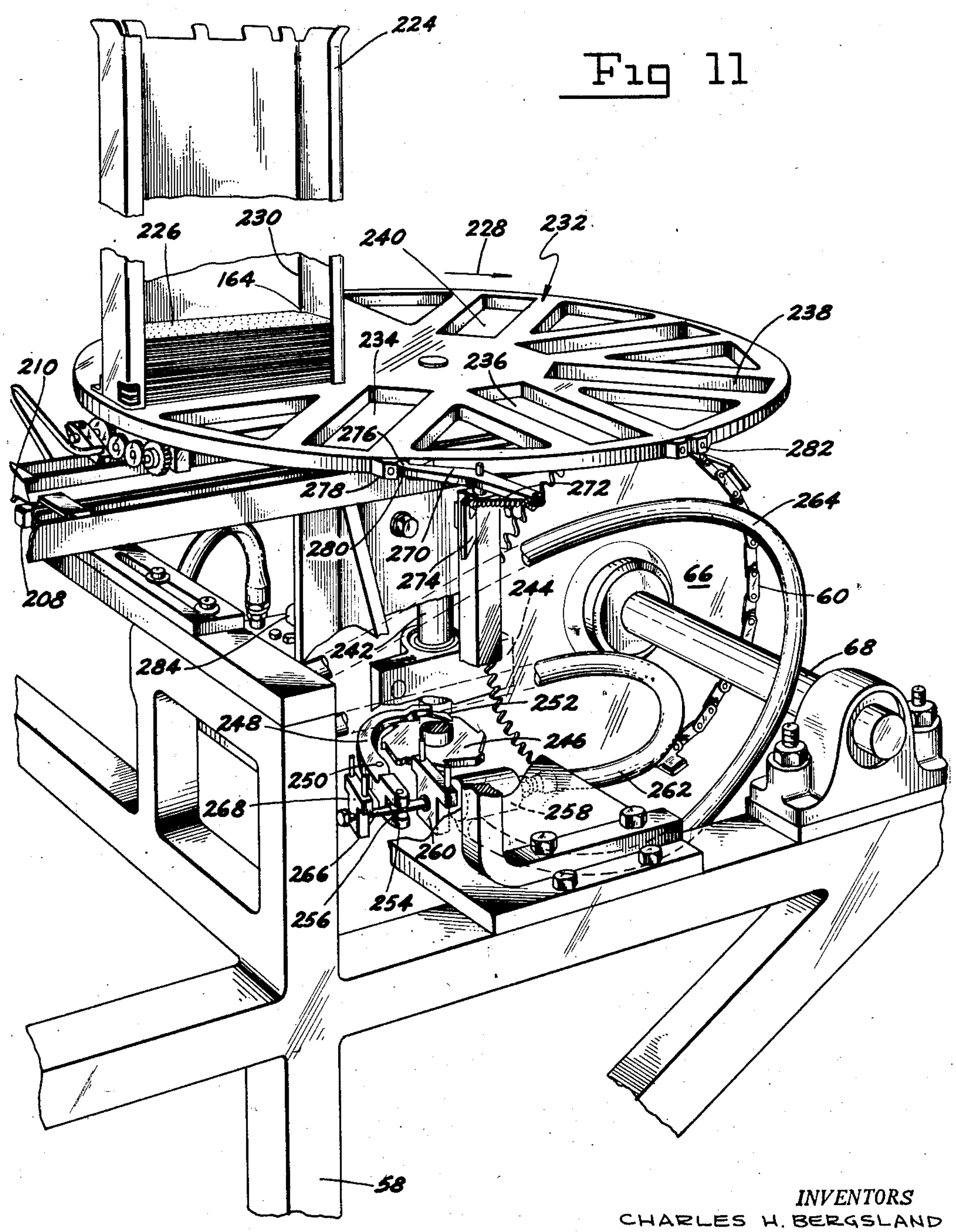
Fig. 11 is a perspective view of the mechanism for supplying the individual circuit boards to the machine.

The switch 208, shown in Fig. 6, which has a switch arm 210, is also shown in Fig. 11 and functions to operate the mechanism for controlling the feed of the circuit boards to the conveyor. This will be described in greater detail in connection with the mechanism for feeding the boards to the conveyor.

*Feeding the circuit boards*

The individual circuit boards are engaged by the fingers carried by the conveyor chains and are pushed through the conveyor between the guides 136 and 138. The circuit boards are individually dropped to be positioned for engagement by the fingers by a feeding system which will be described in connection with Figs. 8 and 11 through 16.

The boards are dropped one at a time on a plate 212, Fig. 8, which is positioned between the conveyor chains and is supported from a cross bar 214 which helps support the conveyor channels.

For centering the boards so that they will be positioned exactly between the guides 136 and 138, a pair of inclined surfaces 216 and 218 are provided. Thus although the board may be dropped on the plate 212 slightly out of position, the surface 216 or 218 will cause it to slide to a position where it is centered. When picked up by the fingers 160 and 162 it will enter between the guides 136 and 138. A spring depressor 222 may be provided to hold the boards down as they are carried forward so they will not accidentally be pushed along on top of the guides instead of having their side edges in the grooves of the guides.

*Circuit board magazines and turret*

Referring now to Fig. 11, a magazine 224 is shown for supporting a supply stack 226 of circuit boards. The magazine is rectangular in shape and has one open face so that the operator may lower the stack of boards by hand. The boards are shown at 226 and may be provided with notches 164 at the corners. The magazine is provided with small rectangular projections shown in one corner at 230 which matches the notches 164 of the board so that the boards will always be placed in the correct position in the magazine and will not accidentally be stacked backwards.

A series of magazines similar to 224 are positioned on the rotary turret 232, the remaining magazines being removed to better illustrate the turret. The magazines are removed in the drawing for clarity and are secured to the turret table 232 over the rectangular openings shown at 234, 236, 238, and 240. Each magazine also carries its own board dropping mechanism which have also been removed from the drawing where the magazine has been omitted.

The turret is so constructed that when the magazine 224 which is in delivery position becomes empty, the turret is indexed so that the succeeding magazine will be moved to delivery position. The succeeding magazine is of course the one positioned over rectangular opening 234 and the turret rotates in the direction indicated by the arrow 228.

The apparatus for indexing the turret to move a new magazine to delivery position is best shown in connection with Fig. 11. The turret is rotatably mounted on a vertical support shaft 242, the shaft being supported in suitable bearings such as at 244, which are supported by the frame. Portions of the frame and bearings are removed in Fig. 11 to better illustrate the indexing mechanism. Secured to the lower end of the shaft 242 is a toothed ratchet wheel 246 engaged by a pusher arm 248. The pusher is pivotally supported at 250. The pawl 248 has a pawl 252 pivotally connected at its end to engage the teeth of the ratchet wheel. The pawl 252 is spring-urged to engagement with the teeth by a spring which is not shown. Thus it will be seen that as the pusher is pivoted in a counterclockwise direction in Fig. 11, the pawl 252 will be drawn to engage a new tooth in the ratchet wheel 246. As the pusher is again pivoted in a clockwise direction, the pawl will push the teeth of the ratchet wheel forwardly to rotate the shaft 242 and thus index the turret.

In normal position, the pusher is in the forward extended position and to index the turret it backs off, engages a new tooth and immediately moves to forward position to remain there until another magazine empties.

For obtaining this movement for the pusher arm 248, the base end of the pusher arm 254 is bifurcated. Connected between the fingers of the bifurcated end is the plunger 256 of a fluid cylinder 258. This cylinder and plunger are supported from the frame by the member 260. Fluid is furnished to the plunger through the line 262 to force the plunger outwardly and pivot the pusher arm 248 in a clockwise direction to the forward position in Fig. 3. Fluid is furnished to the other end of the cylinder through a line 264 to withdraw the plunger and cause the pusher 248 to be pivoted in a counterclockwise direction to move the turret ahead.

An adjustable stop member is provided to adjust the position of the magazine turret in its stopped position. This member is in the form of a bolt 266 which is threaded into a support 268. The end of this bolt is engaged by the plunger 256 of the fluid cylinder 258 so that the limit of its extended motion will be determined by the position of the stop bolt 256.

The plunger 256 in Fig. 11 is shown in engagement with the stop bolt 266 since this is the position which it normally has while the magazine 224 is in delivery position over the conveyor. Thus the setting of the stop bolt 266 will determine the position of the turret and the magazine in the stopped position.

While the magazine is delivering circuit boards to the turret, the line 262 to the fluid cylinder is pressurized to hold the plunger 256 in its extended position and to hold the pusher arm and pawl 252 tightly against the ratchet 246.

An additional braking apparatus may be provided to prevent overtravel of the magazine turret 232 and to lock it in delivery position. For this purpose a brake arm 270 is biased against the periphery of the turret. A tension spring 272 connects between the end of the brake arm and a bracket 274 to urge the operative end 276 against the peripheral edge of the turret. In addition to the braking effect of the operative end 276 of the brake arm 270 as it engages the edge of the turret, a recessed block 278 is secured to the edge of the turret. This recessed block has a pocket 280 into which the end 276 of the brake arm seats to lock the turret in position. The recess 280 is sufficiently shallow, however, that as the turret is moved by the operation of the pusher arm 248, the brake arm will be drawn out of the pockets and the turret can freely move to the next position where the end of the brake arm will drop into the pocket of the next recess block 282.

Operation of the fluid cylinder 258 is performed by alternately pressurizing line 262 and venting line 264 or pressurizing line 264 and venting line 262. This operation is performed by a valve shown generally at 284, the valve being connected to a source of pressurized fluid such as oil or air.

The operation of the valve 284 is performed electrically and controlled by a combination of switches, including switch 208. Another switch in circuit with 208 is switch 288 operated by the cam 286 which is rotated with the main cam shaft 104 as shown in Fig. 4.

These switches and circuit diagrams will later be explained in greater detail in connection with Fig. 53. Generally described, the switch 288 which bears against the cam 286, when closed by the cam, will operate the valve 284 to vent line 262 and pressurize line 264. This will index the pusher arm 248 to the left to cause the dog to engage the succeeding tooth. When the magazine operating switch 288 is again opened by the cam 286, the line 264 will be vented and line 262 will be pressurized, causing the pusher 248 to be pivoted in a clockwise direction to index the turret and move a succeeding magazine over the conveyor.

This action, however, is prevented by the switch 208 if it is depressed by a board. If no board is fed because the magazine is empty, switch 208 is not depressed and the above action occurs to cause the turret to index a new full magazine into position.

*Board releasing mechanism*

The boards are individually dropped from the magazine to be deposited on the conveyor. For satisfactory operation, the boards must be dropped flat and be delivered from the bottom of the magazine stack 226. To accomplish this, as shown in connection with Figs. 11 through 16, a board is dropped each time the conveyor begins to move in order that it may be picked up by the conveyor pusher fingers. The board dropping mechanism is actuated by the same shaft 178 which operates the stop arms 128.

As illustrated in Fig. 12, the stop arm 128 is attached to the arm operating shaft 178. Also attached to this shaft is an arm 290 which operates to cause the circuit board to be dropped. As shown in Fig. 12, the circuit board 132 is stopped, engaging the head 130 of the stop arm 128. When the shaft 178 rotates, the stop arm 128 is pivoted to release position as shown in Fig. 13. At this moment the circuit board drops on the conveyor and the conveyor starts to move.

The arm 290 pivoting to the right in Figs. 12 and 13 strikes a pawl 294 with its offset end 292. Since each magazine carries its own releasing mechanism, the pawl 294 will be carried into operating position with respect to arm 290 when the magazine is indexed into feeding position. The pawl 294 is attached to a shaft 296. This shaft 296 extends longitudinally along the bottom of the stack of boards 226 and carries on it board-releasing cams as shown at 298 in Figs. 14 to 16. The shaft also carries a gear 300 which meshes with succeeding idler gears 302 and 304 to rotate another gear 306. This gear 306 is secured to a shaft 308 which extends longitudinally along the other side of the bottom of the stack of circuit boards parallel to shaft 296 and also carries board-releasing cams 310 and 312, Figs. 13 to 16. Thus through gears 300, 302, 304, and 306 the shafts 296 and 308 are caused to be rotated in unison.

The shafts have a normal position in which they support the stack of circuit boards by supporting the bottommost board. The shafts are shown in this position in Figs. 13, 14, and 16. They are moved to a first drop preparing position by a spring 314 which is connected between a pin 316 on gear 306 and a pin 318 on gear 300. The drop preparing position is shown in Figs. 12 and 15. The spring tends to rotate gear 300 in a counterclockwise direction and gear 306 in a clockwise direction as illustrated in Figs. 12 to 16. This of course tends to rotate the shafts 296 and 308 and their cams 298, 310, and 312 which carry the stack of circuit boards also in a counterclockwise and clockwise direction, respectively.

The operation of the board-releasing cams 298, 310, and 312 is shown in the series of Figs. 14 to 16. In Fig. 14 the cams 298 and 312 are shown in their normal supporting position which is their position in Fig. 13 when the conveyor is moving. The cams are held in this position by arm 290 depressing pawl 294.

The cams have rounded arcuate faces 320 and 322, respectively, against which rests the lowermost board 324 of the stack 226.

When the conveyor stops and stop arm 128 pivots, the arm 290 releases the pawl 294, and the cams 298 and 312 are rotated counterclockwise and clockwise, respectively, as caused by spring 314 and shown by the action illustrated in Figs. 12 and 15.

This permits the stack of boards 226 to drop down so that the lowermost board 324 rests in the notches 326 and 328 of the cams 298 and 312. These notches are formed by cutting back the material of the cam from the curved surfaces 320 and 322 which, in effect, forms a shoulder in the cam on which the board rests.

The next action of the cams is to return to normal position to release the lowermost board and again support the stack of boards. To perform this, the cams rotate back to normal position as illustrated in Fig. 16. This is caused by the shaft 178 rotating back to move the stop arms 128 to release position of Fig. 13. As this happens, the arm 290 strikes the pawl, applying rotational movement to the gears 300 and 306. When this occurs, the bottommost board 324 is released and the rounded shoulders 320 and 322 again move beneath the stack 226 of circuit boards to support the next succeeding board 330, Fig. 16. The board 324 has been released and drops down on the plate 212, being centered thereon by the inclined shoulders 216 and 218 as is also illustrated in connection with Fig. 8.

As will be noted in the figures, the circuit boards are separated in their stacks by small support pins such as 332 and 334 on the board 324. These spacer or support pins permit the rounded surface of the release cams to move between the boards to release the lowermost board and support the rest of the stack. The cams, however, will be operative if different forms of boards are used which have no separating means, if the shape and size of the rounded surfaces and the notches are changed slightly so that the points 336 and 338 on the cams will move between the lowermost board and the next succeeding board when the lowermost board is dropped.

It is to be noted that the stack of boards is supported at all four corners by the cams and that the cams are simultaneously operative so that the board will be released at the four corners simultaneously. This will cause the board to be dropped flat on the conveyor so that it may be readily engaged by the pusher fingers of the conveyor to be carried along through the attaching stations.

*The attaching heads—positional adjustment*

As shown in Figs. 1 and 17, the attaching heads 52, 54, and 56 are supported beside the conveyor at the attaching stations. For this purpose the frame 58 carries a longitudinally extending plate 340, Figs. 3 and 17, which extends the length of the machine parallel with the conveyor. This plate is supported by legs 342 and 344, Fig. 17, above the frame 58 so as to have a projecting flange 346 and 348 on each side. The heads rest on top of the plate 340 as shown in Figs. 17 and 20 and are slidable on the plate in a direction parallel to the conveyor. This longitudinal adjustment of the head is accomplished by an adjustment bolt 364 rotatable in a fixed clamp 362 secured to the plate 340 by underhanging clamps 351 and 353 which are drawn up beneath the plate by bolts. The head is slidably held to the plate 340 by clamping plates 350 and 352 held by bolts 354 and 356, Figs. 17 and 20.

Although the machine carries a plurality of heads, each of the heads is basically the same and therefore only one need be described, as illustrated in Fig. 17. Each of the heads, however, is adapted for quick and easy change to handle electrical components of different sizes and types. Means for making these adjustments will be described later in the specification. Thus, although heads 52, 54, and 56 of Fig. 1 are basically the same heads, they may attach different types of components to the circuit board, as do the other heads for the machine.

It follows that as well as attaching different types and sizes of components to the circuit boards, these heads must attach the components in different positions and in different orientations on the boards. For this purpose, each of the heads is completely adjustable in position with respect to the conveyor so that the conveyor may always carry the boards through the machine in a fixed position relative to the machine frame. The conveyor boards are always sotpped at the attaching stations in a fixed position but components may be attached at different positions to the board by changing the position of the attaching head.

To achieve this end, the head is first adjustable in a direction parallel to the conveyor by rotation of bolt 364 as previously described with reference to Fig. 20. The longitudinally extending plate 340 is provided with an upstanding clamp 362 which is clamped to the plate 340 and which rotatably carries a threaded bolt 364 provided with a squared end 366 for rotational adjustment. The member is threaded into a threaded hole 368 in the side of the slide. Rotation of the longitudinal adjustment member 364 will adjust the position of the base 360 with respect to the plate 340.

Mounted on top of base 360 is a lateral sliding base 370. This base 370 is provided with slots 372. Bolts 374 and 376 extend downwardly through the slots to be threaded into the base 360. The longitudinal sliding base 360 is provided with an upstanding bracket 378 in which is rotatably mounted a lateral adjusting screw 380 which is provided with a squared end 382 for adjusting the lateral position of the lateral sliding base 370. Rotation of the screw 380 will move the slide 370 laterally with respect to the conveyor. A raised guide 384 extends upwardly into a rabbeted groove 386 to guide the sliding motion of the lateral sliding base 370. When the proper adjusted position is reached, the bolts 374 and 376 may be tightened to lock the head in position. Adjustment of the head in a direction parallel to the conveyor is therefore obtained by rotation of bolt 364 and adjustment laterally of the conveyor is obtained by rotation of bolt 380.

Thus the position of the head may be adjusted in either direction with respect to the position of the circuit board when it is stopped at the attaching station so that when the inserter head, which functions to bring the leads of the component down into the holes in the circuit board, descends, it will be positively aligned with the holes in the board.

In some instances, however, the holes on the board have different orientation, i.e., they may be parallel to the direction of movement of the board or lateral thereof or at some angle therebetween. To align the electrical components with such holes, the inserter member is adjustable in a rotational direction with respect to the head.

As shown in Fig. 17 the head has a vertical upright portion 388 which extends upright from the longitudinal and lateral sliding bases. To the upright portion 388 is attached an overhanging arbor portion 390 which supports the operating mechanism over the circuit board 132. The operating mechanism consists basically of apparatus for holding a supply of electrical components, for feeding the components to the machine, for bending the leads of the components toward the circuit board, and for carrying components to the circuit board and inserting the leads into the holes therein.

The arbor portion 390 of the attaching head, as may be seen in Figs. 17, 18, and 19, extends outwardly in a frame having a somewhat annular flange 394 extending around the edge. Within this flange 394 is a central web 396 having a circular opening 398 in the center. Rotatably mounted in this opening 398 is the aforementioned operating mechanism.

As illustrated in Fig. 17, the operating mechanism is supported on an annular disk 400 which has an annular lip 402 on its upper edge which rests on a shoulder 404 in the web 396 so that the operating mechanism may be supported from the arbor.

To secure the supporting disk 400 in the opening 398, clamping members 404 and 406 are provided, Figs. 18 and 20. These clamping members consist of bolts 408 and 410 extending downwardly through the web 396 and carrying eccentric washers 413. When these washers are rotated so that they project out over the disk 400 and the bolts 408 and 410 are tightened, the disk is securely fastened within the web. By loosening the bolts, the position of the disk and the operating mechanism which it supports may be rotated to any position within 90°. One extreme position is shown in Fig. 17 and the other 90° from the first is shown in Fig. 18. The extreme rotational positions are limited by stops 409 and 411 striking the ends of an enlarged area 415 cut from the web 396 for a distance along the edge of the annular opening 398.

*Electrical component magazines and turret*

With each operation of the attaching head, a separate electrical component is attached to the circuit board. The components are supplied to the machine from magazines and as shown in Fig. 17, a magazine 412 is in feeding position, supplying components to the feeder and component straightener 414 which will be later described in detail in connection with Figs. 26 to 30.

The magazines are removably mounted on the turret 416 with individual magazines being supported on brackets 420 and 430. Magazine 412 is supported on bracket 420 illustrating the manner in which the magazines are supported on the turret but the remaining magazines have been removed for clarity. The construction of the magazines is shown in detail in Fig. 23 with magazine 412 being shown in that figure. Each magazine is shown with an upper clamp 424 and a lower clamp 426. These clamps are hooked over brackets 420 and 430 as shown in Figs. 17, 21, and 23. As thus supported the magazines can easily be removed or replaced by merely lifting them off of the brackets.

The magazines are loaded with the components away from the machine and subsequently mounted on the turret whereupon the turret rotates them to feeding position as the magazines empty.

The magazines are shown formed of two sections of pressed steel joined by seams 432 and 434 at their edges, Fig. 23. The two steel sections form a central rectangular central portion 436 in which the body of the component 438 in the cut-away portion is located. Extending laterally from each side of the rectangular center portion are narrow slots 440 and 442 in which the leads 444 and 446 of the components are located.

The components are thus stacked in the magazine, resting one on top of the other. Elongated openings 448 are provided in the back wall of the magazine so that the number of components in the magazine may be observed. If components become disarranged or twisted in the magazine, this may also be observed through the openings.

At the bottom end of the magazine is provided a spring stop 450 which blocks the opening and prevents the electrical components from dropping out through the open bottom. This spring stop 450 is positioned across the center of the bottom end of the magazine until it is automatically moved to one side when the turret is rotated in the direction of arrows 458, Fig. 21, and the magazines are moved to the feeding position as shown by magazine 412 in Fig. 21.

This operation is illustrated in detail in Fig. 21. Secured to the central disk 400 of the turret is a fixed cam 452 which engages a downwardly extending lip 454 on the stop spring and bends it inwardly away from the bottom opening of the magazine so that the components are free to drop into the feeder 414 of Fig. 17. The cam 452 has a gentle sloping area 456 which moves the stop away from the bottom of the magazine when the magazine is carried by the turret in the direction shown by the arrow 458. During the time the magazine is supplying components to the feeder 414, the lip 454 of the stop spring 450 rests against a flat portion 460 of the cam and is held out of the path of the components.

When the magazine is empty, the turret 416 automatically rotates or indexes to move a succeeding magazine into feeding relationship with the feeder 414, Fig. 17. As a means of providing a signal to the magazine indexing mechanism to inform it when the components are exhausted from a magazine, a follower block 462 (Fig. 23) is provided which rests on top of the stack of components in the magazine. This follower block has a switch-actuating finger 464 which depresses the switch arm 468, Figs. 21 and 24, when the supply of components in the magazine becomes exhausted. The switch-engaging finger 464 projects into a channel 466 provided in the front face of the magazine.

As the switch-engaging finger 464 moves downwardly in the channel, it engages the switch arm 468 as shown in Figs. 21 and 24. This switch arm is mounted on a switch 470 having a plunger 472. Actuation of the switch 470 will cause the turret 416 to index. The position of this switch in the electrical circuit will be described later in connection with Fig. 53. The switch 470 is mounted on the disk 400 as is illustrated in Fig. 24.

The mechanism for indexing the component turret is best shown in connection with Figs. 21 and 22. As therein illustrated and as shown in Fig. 17, the turret utilizes an outer cylinder 474 which is rotatably mounted on a fixed inner cylinder 476. To the outer cylinder is connected a top disk 478 carrying the brackets 420 which support the magazines.

Further down on the outer rotatable cylinder 474 is mounted another disk 480 which supports the brackets 430 which also support the magazines. Still further down on the outer movable cylinder is connected a ratchet wheel 482 which rotates the magazine turret. In Figs. 21 and 22, the outer rotatable cylinder 474 and the ratchet 482 are shown with the central supporting cylinder having been removed. The upper disk 478 and part of the lower disk 480 are broken away to expose the ratchet.

The ratchet wheel is indexed by a pivotal dog 484 which is pivotally supported on the end of an arm 486. The arm is pivoted at 488 on a fixed pivot supported on the disk 400. Pivotal movement of the arm rotates the ratchet and the magazine turret forwardly to move a new magazine into position. To obtain pivotal movement of this arm 486 the end is connected to the plunger 490 of a fluid cylinder 492, the cylinder also being shown in Fig. 17. In Fig. 21 the plunger 490 is shown in normal position with pressure in the cylinder 492. In this position, the turret is locked against movement and the magazine is feeding to the feeder.

When the magazine becomes empty, the finger 464 engages the switch arm 468. This operates a solenoid valve, not shown, to cause the fluid or air in the cylinder to withdraw the plunger 490 to retracted position, thus moving the arm 486 to the position shown in Fig. 22 where the dog 484 engages a new notch on the ratchet 482.

For ejecting the plunger 490 and rotating the turret forward, the solenoid valve, which is not shown, is operated by switch 288, Fig. 4, which is controlled by cam 496 carried on the cam shaft 104. When this switch is closed, the plunger 492 will again be ejected from the piston 492 and the arm 484 will push on the ratchet wheel 482 to index the turret to the position shown in Fig. 21.

When this occurs, switch arm 468 will be released since the magazine having the finger 464 depressing the switch arm 468 will be moved away from the switch arm.

When the arm 486 has been pivoted to the normal component feeding position of Fig. 21, the head of position-adjustment bolt 498 bears against the dog 484. This bolt is threaded into a fixed bracket 500 which is supported on the disk 400. As the bolt 498 is turned in or out, small adjustments in the position of the ratchet wheel 482 will occur and thus the bolt 498 serves as a positioning device for the turret.

The bracket 500 also supports a spring lock 502 which drops behind the teeth 504 of the sprocket wheel as it is indexed, thus preventing it from rotating backward. The spring also rides against the teeth as the sprocket is advanced, acting as a brake and helping to prevent overtravel.

*Component feeder and straightener*

As the component leaves the magazine 412 as shown in Fig. 17, it enters the straightener and feeder 414. This feeder is shown in detail in Figs. 26 through 30. Because the magazine 412 is not always perfectly aligned with the feeder and because the components may not always be perfectly aligned within the magazine due to being improperly loaded or jarred as the magazine is mounted on the turret or as the turret is rotated, the components must be straightened so that they will continue to feed to the attaching head and will be accurately positioned for bending the leads and inserting them into the circuit board.

The feeder and straightener, Fig. 17, is suitably supported on the disk 400 and from the inserter which is suspended beneath the disk, the magazine supports being shown in the form of clamps 415.

To straighten the components they are dropped through a zigzag path which is defined by slots 690 and 692 in each side of the feeder 414, Fig. 26. The feeder includes a curved metal guide 694 containing the slot 690 and another guide 696 containing the other slot 692. As the component 698, Fig. 30, passes down through the guides, the component body 700 is located between the guides and the component leads 702 and 704 are positioned in the zigzag slots 690 and 692. The zigzag slots are cut to a special shape so that the component will automatically be straightened to a horizontal position, and the slots are so shaped to function to prevent one lead of the resistor from moving downwardly until the other lead moves downwardly into substantially the same horizontal plane.

The feeder 414 comprising the two guides 694 and 696 is shown curved to the right in Fig. 26 but this curvature is merely to direct the components from the magazine to the inserter head and the guides may be curved to any direction to deliver the electrical components where desired.

As shown in Fig. 26, the guide members 694 and 696 of the feeder are secured to spacers 706 and 708 which hold them apart a distance sufficient to permit passage of the component body 700. Other spacers, not shown in Fig. 26, are provided for each of the guides to hold the two members which form each guide to the proper spacing so that the zigzag gap 609 or 692 will remain at the proper size.

To form the zigzag gaps in each of the guide members, the rectangular elongated metal guides 694 and 696 are cut to form a gap, as shown in Fig. 27, with parallel zigzag sides 710 and 712. The sides 710 and 712 which define the gap appear as parallel zigzag lines when viewed from the inner face as is shown by the sectional view of Fig. 27. The sides of the gap, however, are flat surfaces which diverge outwardly so that the gap is narrower next to a component body than at the end of a component lead. Thus if a vertical plane is passed through the feeder, it will intersect the surfaces 710 and 712 of the gap in parallel zigzag lines. As the intersecting vertical plane is moved outwardly away from the space 714 between the guides, the zigzag gap will grow wider.

Any horizontal plane which is passed through the guides will form lines of intersection with the zigzag gap which move outwardly from the space 714 between the guides. This may be illustrated by the horizontal sections shown in Figs. 28 and 29. The section of Fig. 28 is taken through Fig. 26 to intersect the peak 716 of the zigzag path on one member of the guide and to intersect the valley 718 on the other member of the guide. While it will be seen in Fig. 26 that the line 716 forming the peak at one side of the gap and the line 718 forming the valley at the other side of the gap are parallel to each other in the horizontal plane, it will also be seen in Fig. 28 that they diverge away from each other when moving outwardly along the gap. Thus to form the zigzag gap in each of the guides of the feeder, a series of flat surfaces are cut through the guide and the cut surfaces being so arranged that vertical lines drawn on opposing surfaces will be parallel but horizontal lines will be diverging.

The parallelism of the peaks and valleys of the zigzag path in the horizontal plane and their divergence in the vertical plane as illustrated in Fig. 28 are also shown in Fig. 29 which is a section taken through the feeder of Fig. 26 at a point below that of the section of Fig. 28. This section passes through a valley in one part of the guide member 494 and through a peak on the other part of the guide member. Since the horizontal plane cuts both the peak and the valley, it indicates that these lines are parallel to each other in the horizontal plane. The valley line 720 and the peak line 722 are shown diverging in Fig. 29.

The function of this uniquely shaped feeder will be described in connection with Fig. 30. It serves to hold the one lead of an electrical component until the other lead has dropped down so they will be in the same horizontal plane. In Fig. 30 the lead 702 is lower than the lead 704 and the end 724 of the lead will engage the flat surface 690 of the guide while the side of the lead will be pressed against the peak 726 of the other side of the zigzag path. The lead 702 will remain wedged in this position until the lead can approach being parallel to the horizontal peak 726 at which time it can pass between the surfaces 690 and 728 which define the zigzag gap. The lead 702 will remain wedged, however, in the position in Fig. 30 until the lead 704 can drop down into the gap 692. This same action occurs all the way down through the feeder so that the electrical component can not become twisted but must always remain in horizontal position.

In practice the components 700 will stack up on top of each other as may be seen in Figs. 31 and 32 but the zigzag feeder will continue to function to keep the components straight.

The lowermost component in the feeder 414 rests against the fingers 506 of Figs. 17, 31, 32, and 35. The fingers serve to release individual components each time the anvil carriage 534 pivots in a clockwise direction as will be more fully described in connection with the operation of the anvil.

*Bending the component leads and inserting them into the boards*

As the individual components descend along the feeder 414 and are passed by the fingers 506, they are fed to anvil support fingers 508.

The anvil members support the electrical components by their leads while the leads are being bent by the inserter member, the inserter shown generally at 510 in Figs. 31 to 34 and 38 to 40. The inserter member has a pair of bending fingers 512 and 514, the operation of which will be described later in greater detail.

As illustrated in the enlarged detail of Fig. 31, the lowermost component 516 in the feeder 414 is held by the restraining fingers 506 and 507. These fingers are turned up at their ends to hold the component wires. As the components reach the lower end of the slots 690 and 692 of the feeder, the leads rest on inclined ramp members 522 and 524 as is shown in Fig. 35.

It is to be noted that for purposes of illustration the feeder is shown in simplified form in Figs. 31 to 34, being formed with even zigzag gaps which do not diverge. In Fig. 35 the feeder is shown even more simplified, being formed of thin sheets of material. These alternative forms have many of the advantages of the form of Fig. 26.

The ramp members 522 and 524 of Fig. 35 have upper edges which are inclined downwardly to permit the resistor to roll from the end of the feeder 414 into the notches 526 and 528 of the anvil fingers 530 and 532. The anvil fingers and the ramp members are both supported from the anvil carriage 636. This carriage permits these members to be moved out of the way of the inserter head 510 when it descends past the anvil fingers as will be later explained. Thus the ramp members guide the component in its drop from the position shown by the component 516 in Fig. 35 to the position assumed by the component 536 in Figs. 31 and 32.

To aid in centering the component on the anvil fingers, guides 538 and 540 are also supported on the anvil carriage 636. Tho positioning of the component on the anvil fingers is important since the length of the lead which will be bent downwardly toward the circuit board is determined by the amount of the lead which projects beyond the anvil fingers. Thus if these lengths are unequal, the lengths bent down will be unequal and the component will not be properly attached to the circuit board.

The velocity of the component 516 dropping down on the anvil fingers may in some instances be sufficient to cause it to bounce or dislodge itself from the notches 526 and 528, Fig. 35. To be sure that the component does not bounce out of the notches a bumper 542 is positioned opposite the anvil fingers to be engaged by the component body as the component attempts to jump out of the notches. The bumper member 542 and the guides 538 and 540 may, for manufacturing convenience, be made of a single piece of sheet metal which is suitably attached to the base of the anvil fingers as is illustrated in Fig. 35.

In some instances where a very small component is used, it may be desirable to use the centering guides illustrated in Fig. 36. The anvil fingers 544 and 546 have the same design as in Fig. 35 and are provided with notches 548 and 550 in which the leads of the component 552 rest. In this instance, however, to center the body of the component between the anvil fingers a pair of inclined guides 554 and 556 project inwardly from the inner surfaces of the anvil fingers. The upper edges of these guides engage the end of the component body when the component rolls down into the notches of the anvil fingers. Thus as the component rolls down the inclined surface of the fingers, it is automatically centered by the guide surfaces 554 and 556.

In some instances, it is desirable to omit the bumper 542 and use a stop 558 such as pictured in Fig. 37. This may be the case when an extremely small component is used and the component holding apparatus of Fig. 37 is to be used rather than then the apparatus illustrated in Figs. 31 to 34 and Figs. 40 to 42. The inserter head 732 illustrated in Fig. 37 functions similarly to the head 510 in Fig. 31 which will be described later in detail.

After the small component 537, Fig. 37, is positioned on the anvil fingers 530 and 532, the inserter head 732 descends upon the component. This descent is caused by an air cylinder which is pressurized to cause the head to descend and again reascend after the component is inserted into the board. The air cylinder may be taken as that shown at 562 of Fig. 17, and for purposes of description, it may be assumed the mechanism of Fig. 37 is substituted for the second inserter member 572 of that figure.

When the head descends on the component, pressure blocks 736 and 738, Fig. 37, engage the component leads 740 and 742 pressing them down against small support platforms 744 and 746 which are supported from the anvil 745. The pressure blocks 736 and 738 are joined to each other by a cross bar 747 and this bar also carries a shield 558 which functions as a bumper to prevent the component from bouncing out of the notches in the anvil fingers when it has dropped into position.

The pressure block, cross bar and bumper form part of an assembly 759 which is slidably mounted on member 732.

The cross bar 747 has secured to it a plunger 748 which is surrounded by a spring 750. The plunger has a head 751 which holds the assembly 756 on member 732. The spring 750 pushes downwardly on the cross bar to urge the pressure blocks 736 and 738 downwardly against the component leads. These blocks carry rubber pads on their lower surfaces for gripping the leads.

As the head 732 continues downwardly and the blocks 736 and 738 strike the component leads, they will stop their movement and the spring 750 will compress. The continued downward movement of the head 732 will cause the bending fingers, as illustrated by finger 752, to move together to bend the leads 740 and 742 against the sides of the anvil fingers 530 and 536.

The apparatus for causing the fingers to move together and the action of the fingers in bending the leads will be described later and is caused by the same mechanism as illustrated in Figs. 40 to 42. The only difference in the operation of the head of Fig. 37 is that the wires are held by the blocks 738 and 736 against the platform 744 and 746 instead of merely being engaged by members as is illustrated in the embodiment of Figs. 41 and 42.

When the anvil fingers 530 and 532 drop away from the leads, however, means must be provided to prevent the spring 750 from pushing the blocks 738 and 736 downwardly, since they would force the component out from between the fingers if the spring 750 were free to act. To prevent this, the bending fingers, as illustrated by the finger 752, are provided with a catch in the form of a protuberance 754. This protuberance locks under a shoulder 756 in the block 736. The protuberance 754 moves under the shoulder 756 when the finger 752 is moved inwardly to bend the leads and the block slide assembly 759 is thereby prevented from sliding downwardly.

As above stated, the mechanism of Fig. 37 is described as an alternate embodiment and has certain advantages when used with components which are very small and have very thin leads, the lead shown in the illustration being enlarged for purposes of illustration only.

As illustrated in Figs. 17 and 31, 38 and 39, an inserter head 510 is provided which is moved downwardly past the anvil to bend the leads and to carry the electrical component against the circuit board. For obtaining the vertical movement downwardly toward the circuit board, the inserter 510 is connected to the plunger 560 of a pneumatic or fluid cylinder 562 in Fig. 17. This cylinder is suitably supported and positioned within the hollow fixed tube 476 of the rotating turret. An air or fluid line 564 leads to the cylinder and to a suitable source of air pressure although other fluid pressure may be used. An air cylinder has been found to be advantageous for operating the inserter because of its yieldable or resilient action. For example if the downward travel of the inserter is blocked, the machine will not be damaged.

In the present machine pressurized fluid is used on the indexing mechanism for the circuit board magazines, on the indexing mechanism for the component magazines, and air pressure on the operating mechanism for the inserter. These pressure operation mediums are supplied from pumps and compressors of types well known to the art and are not described in detail herein.

The inserter 510 has a sliding yoke portion 566 which is connected to the plunger rod 560 of the cylinder and which is guided for vertical up and down movement by vertical guide rods 568 and 570, Fig. 38. Suitably secured to this inserter yoke is a first inserter member 572, Figs. 17, 38, and 39.

*Slidably mounted on the first inserter member is* a second inserter member 574 which consists of a number of parts and is shown in detail in Figs. 38 to 40, Fig. 40 being viewed from the rear of the inserter. The inserter members are termed first and second not because of any double inserting action but merely for convenience.

In Figs. 17, 38, 39, 40 to 42, 50, and 51, the elements which are assembled to form the first and second inserter members 572 and 574, respectively, are illustrated in general and also in detail. The first inserter member 572 is suitably secured to the yoke 566 as may be seen in Figs. 17 and 38. Member 572 consists of a flat vertical plate which has the rear edges beveled to form surfaces 890 and 892 as shown in Figs. 39 and 40. Fig. 39 is a view taken from the same direction as Fig. 17 and as viewed from the left side of Fig. 38, whereas Fig. 40, is viewed from the rear of Fig. 38.

The beveled surfaces 890 and 892 are formed to supply bearing surfaces for the second inserter member 574 which slides thereon. On the front face of the first inserter member is attached a flat plate 575. To the edges of 575 are attached straps, with straps 894 and 896 extending rearwardly from the top of the plate 575 and straps 898 and 900 extending rearwardly from the bottom of the plate 575.

Joined to these straps is a bearing member which is best seen in Fig. 40 at 903 and this member slides against the beveled surface of the first inserter member 572. Another plate, not shown, is provided to slide against beveled surface 890. These bearing plates, such as shown by 903, also carry the mounting pins 602 and 604 which pivotally support the bending fingers 512 and 514.

The straps 894, 896, 898, and 900 carry at their far ends of plate 625 which may be viewed in Fig. 39. This plate will strike the anvil when the inserter members are descending as was illustrated in Fig. 35 and cause the second inserter member to slide upwardly on the first inserter member to thus cause the lower ends of the bending fingers 512 and 514 to be brought together by virtue of the upper ends of these fingers riding up on the inclined surfaces of the cam plate 616. This cam plate is secured to the first inserter member by bolts 758. The bolts also hold a component pushing member 654 which has downwardly extending projections to engage the component leads to aid in bending the leads and to force the comonent against the circuit board when the leads are inserted.

The extent to which the second inserter member 574 will have sliding movement with respect to the first inserter member 572 is limited by a stop bolt 618. This bolt is connected to the second inserter member, being threaded into plate 575, and as the second inserter member slides up and down on the first inserter member, the stop bolt strikes the top or bottom of the slot 620. A collet 902 is positioned under the bolt head to fill the slot 620 and engages the ends of the slot to protect the stop bolt head as the second inserter member slides up or down.

The second slidable inserter member 574 carries a pair of pivotally mounted lead-bending fingers 512 and 514. These fingers are pivotally mounted at a midpoint at points 602 and 604, Figs. 38 to 40. The second inserter member 574, which is slidably mounted on the first, 572, is normally at the extended position with respect to the first inserter. The sliding movement between the first inserter member 572 and second inserter member 574 is small. In Fig. 39 the second member 574 is shown in the retracted position with the limit screw 618 at the top of the slot 620 and in Fig. 40 the second inserter memberis shown in the extended position with the limit screw 618 at the bottom of the slot 620.

The second inserter member is held at this extended position with respect to the first by a spring 606, Fig.

40, which is connected between the upper ends of the bent fingers 512 and 514. The spring 606 causes the cam follower surfaces 608 and 610 of the upper ends of the fingers to be forced to the lower portion of cam surfaces 612 and 614 of the cam plate 616. The second inserter member can go no further than this extended position because the screw head 618 reaches the bottom of the slot 620.

With reference to Fig. 41 the inserter 510 is in the raised position shown poised above the resistor 536 which is supported by its leads 622 and 623 on the anvil fingers 530 and 532. When the circuit board is stopped at a station opposite an attaching head, air pressure is admitted to the upper end of the cylinder 562 to cause the head to descend. Air to the cylinder is controlled by a valve which is electrically operated by switches to be described in connection with Fig. 53.

In the first action of the inserter, it descends upon the resistor 536 from the positions of Figs. 31 and 40 to the position of Fig. 41. Fig. 41 is viewed from the back of the inserter or from the left of Fig. 31. This descent causes the fingers 512 and 514 to engage the leads and curve them downwardly. As the inserter head 510 continues its downward movement, the bending fingers 512 and 514 are brought sharply together to force the leads 622 and 623 tightly against the outer surfaces of the anvil as shown in Figs. 32 and 42. These outer surfaces, as illustrated in Figs. 40 to 43, comprise upper raised convex ridges 626 and 627 which extend horizontally across the anvil. This is shown in perspective in Fig. 35. Below the ridge is a flat surface 621 and 624 on each finger.

It is to be especially noted that the tips of the fingers 512 and 514 have a groove 627, Fig. 43, which is concave at 631 and exactly matches the ridges 626 or 627 on the sides of the anvil fingers. The lower part of the groove 629 is straight at 633 to correspond to the flat surface 621 of the anvil finger 530. Thus the lead will be bent to the shape illustrated in Fig. 43 by the action of the fingers moving together as in Fig. 42. The upper part of the groove above the pocket 631 curves inwardly to form a shoulder 641 which is above the bulge in the component lead. Thus this bulge is firmly seated in the pocket in the finger and is pushed there by the other finger 514 pushing on the other end of the component. The component can not fall away from the fingers and it can be pushed hard against the board for inserting the leads.

Returning briefly to Fig. 41, it is to be noted that as the fingers 512 and 514 engage the leads 622 and 623, resistance is met in bending the leads that tends to push the second inserter 574 upwardly on the first inserter. This is prevented because the spring 606 is sufficiently strong to hold the upper end of the fingers together to prevent them from climbing the inclined surfaces of the cam 616 and this keeps the lower ends of the fingers spread.

To cause the lower ends of the fingers to move together and force the component leads against the side of the anvil, the cam follower surfaces 608 and 610 ride up on the mating cam surfaces 612 and 614 of the cam plate 616. The fingers are pushed up on these inclined cam surfaces by virtue of the second inserter member, on which the fingers are supported, striking a fixed stop. This action is shown in Fig. 35 by the plate 625 striking the upper surfaces 628 and 630 of the anvil fingers. It is to be noted that the plate 625, which is secured to the second inserter member, is provided with notches 632 which allow the ramp 524 to pass up into the notch and permit the plate to engage the surface 628. An additional notch 634 is provided in the event bigger electrical components are used and a pair of ramps which are wider apart are employed.

Thus when the plate 625 strikes the anvil shoulder 628, the second inserter member is stopped in its downward movement and is thereby forced relatively upwardly from its extended position to the retracted position on the first inserter member 572.

The upward movement of the second inserter member 574 on the first member 572 is limited by the screw head 618 reaching the top of the slot 620. At that precise moment, the anvil 636 is unlocked and the anvil fingers swing out of the way so that the inserter members can continue their downward travel. As the anvil is released the anvil fingers 530 and 532 pivot out from between the bending fingers out of the way of the descending inserter.

The action of the anvil and the related mechanism is illustrated in Figs. 33 and 34. In Fig. 31 the inserter yoke 566 and the head 510 are at their raised positions as also shown in Fig. 38. The inserter then descends to the position of Fig. 32 where it may be seen that the fingers 512 and 514 have engaged the component leads 622 and 623 to bend them downwardly over the anvil members 530 and 532. The anvil during this time remains locked in position by a locking mechanism which will now be described.

The anvil fingers are supported on an anvil carriage shown generally at 636 in Figs. 33, 34, and 35.

The anvil carriage 636, or anvil as it will be referred to, is also shown in Fig. 38 with the anvil fingers removed therefrom for clarity. This anvil is pivotally supported from the frame 670 of the head. As shown in Fig. 38, the anvil is carried on a rotatable shaft 778 which is supported in members 882 and 884 of the frame. The anvil fingers, not shown in Fig. 38 but illustrated in Fig. 35, are supported from the cross bar 534, of a yoke member 886, which extends across beneath the rotatable shaft 778.

Pivotal movement of the anvil to move the fingers out of the way of the descending inserter members is accomplished by a crank arm 648 which is secured to the rotatable shaft 778. Connected between the frame 670 and one end of this crank arm is a spring 730, Figs. 31 and 38. This spring, Fig. 31, holds the anvil in the normal position shown in Fig. 31 with the anvil fingers 530 supporting the electrical component 536.

The anvil is locked in position so that when the inserter head descends it may press against the anvil fingers and bend the component leads. To lock the anvil, a locking arm 640 is pivotally mounted on the frame 670 and has a notch 644 which straddles a pin 646 on the crank arm 648 in the manner shown in Fig. 31. The arm is held in locked position by a tension spring 642 connected between it and the frame.

The locking arm 640 is unlocked by the cam 638 which descends with the head 510 and which is secured to the yoke 566 which carries the head.

As the component leads 622 are bent, as illustrated in Fig. 32, the anvil release cam 638 strikes the anvil locking arm 640 forcing it to pivot rearwardly against the action of the spring 642. This pivots the notch 644 off of the crank pin 646 which is attached to the crank arm 648 of the anvil carriage. Continued downward movement of the head moves the release cam 638 against the roller 650 to cause the anvil 636 to be pivoted in a clockwise direction as illustrated in Fig. 33.

When the inserter reaches a position where the component leads 622 are inserted into the circuit board 132, as shown in Fig. 34, the anvil 636 will have pivoted completely to its retracted position as shown in Fig. 34. When the inserter reaches this position, the locking arm has ridden up along surface 652 which prevents it from being caught on the lower surface of the yoke 566.

Pivotal movement of the anvil also causes a component to be released. When the anvil has pivoted clockwise in Fig. 33, the fingers 506 have released the foremost component 701. The plate 625 has, however, blocked the path of this component, as shown in Figs. 32 and 33, so that it can not fall from the feeder 141.

The component has, however, dropped down a small distance so that when the anvil pivots back, the fingers 506 will miss the leads of component 701 and catch the leads of component 703. When the inserter has moved completely to the top of its travel to the position of Fig. 31, the plate 625 moves above the component 701 and it is free to roll down onto the anvil fingers into the position of the component 536.

The anvil is returned to its position of Fig. 31 when the inserter raises, by the action of the spring 730.

Returning now to Fig. 41, it will be noted that before the anvil has pivoted out of its position for supporting the component leads, a pusher plate 654 having a pair of fingers 656 and 658 projecting downwardly, engages the component leads adjacent the component body 536. This straightens the component leads, aiding the bending action of the fingers 512 and 514 when they force the leads inwardly against the shoulders of the anvil fingers as in Fig. 42.

When the anvil is tripped by pivoting arm 640 to release position and anvil fingers 530 and 532 pivot out from between the lead bending fingers, the component is held snugly and securely between the lead bending fingers by virtue of the arcuate portion of the leads projecting into the concave surface at the index of the fingers. This is shown in connection with Figs. 42, 43, and 46.

An important feature of the invention is the ability of the mechanism to be adapted for components of many different sizes and types. As is illustrated in Figs. 41 and 42, the lead holding member 654 carries the projections 656 and 658 which push on the component leads on each side of the body 536. When component bodies of larger sizes are used, the member 654 may be easily changed by removing the bolts 758 as shown in Figs. 39 through 42 and replacing plate 754 with a plate having fingers which are spaced the proper distance for the component used.

In some instances a large component is used which requires that the body of the component be longer than the distance between the holes. An illustration of this may be seen with the component 758 of Fig. 52. In this instance the body is longer than the distance between holes 760 and 762. In order to insert the leads into the holes they are underbent with the tips of the leads being closer together than the length of the component body.

This change in bending construction can be easily accomplished with a change in design of the bending fingers of the inserter head. As will be seen in Figs. 38 through 42, the bending fingers are pivotally mounted on the pins 602 and 604. As was previously described, these pins extend through the front plate 575 of the second inserter member 574 and are carried by the plates as shown at 902, Fig. 40. When these pins are removed, the fingers 512 and 514 are removed and new fingers 764 and 766, Fig. 44, are pivotally mounted on the pins 602 and 604. The same spring 616 may be used to connect the upper end of the fingers.

It will be noted from Fig. 44, however, that a considerable underbend is applied to the leads 760 and 762 so that their ends will be closer together than the component body 758. To accomplish this the fingers must be given a greater lateral movement than the fingers 512 and 514 and the tips of the fingers are curved inwardly to a greater degree. For imparting a larger pivotal movement to the fingers 764 and 766 a cam such as cam 616 of Figs. 39 and 42 is used having greater rises on the cam edges. As illustrated in Fig. 39, this cam plate 616 may be interchanged with another cam by merely removing the bolts 758 which thread into the first inserter member 572, removing the cam plate 616, and replacing it with another cam plate. The pusher plate 654 is not needed as is seen in Fig. 44, and this plate is omitted when the new cam plate is bolted to 572.

The bending action of the fingers 764 and 766 of Fig. 44 is the same as the sequence shown for the fingers 512 and 514 in Figs. 40 through 42. The fingers 764 and 766 first engage the leads, bending them down over the anvil fingers 768 and 770 in a manner similar to the action of the mechanism shown in Fig. 41. Since the body of the component 758 fills up substantially the entire space between the anvil fingers, there is no need to apply pressure on top of the leads and they will bend smoothly around the anvil fingers. The bending fingers are then brought together to bend the leads together to the position shown in Fig. 44. The leads are curved over the anvil fingers 768 and 770 to be forced into the hollows of the fingers. It will be noted different anvil fingers are used and for this purpose the anvil is changed in the manner which will be later described. The new anvil fingers also have flat surfaces 769 and 771 against which the lower ends of the leads engage as they are pushed inwardly by the fingers 764 and 766. These surfaces straighten the ends of the leads and point them toward the circuit board so as to be able to enter the holes in the board. When the head descends, the leads 760 and 762 will be inserted into the holes in the circuit board.

It will also be noted from Fig. 52 that in some instances components such as 680 are required which have twin leads at each end shown by leads 772 and 774. These different types of components can be accommodate as easily as was the component of Fig. 44. The inserting head can be quickly and readily adapted to handling the component by merely changing the bending fingers. The bending finger used with twin lead components is shown at 766 in Fig. 45. This finger with another companion finger takes the place of fingers 512 and 514 of Fig. 42.

To accommodate the twin leads, the finger has two notches 768 and 770, with the base of the notches being spaced outwardly from the inner face 773 of the finger so that the lead curvature will extend into the inner face 773 of the finger to be securely held therein. A shoulder 775 projects rearwardly from the inner face and completes the hollow formed by the projecting notches and shoulder and receiving inner face and shoulder will push down on the leads as they are inserted into the board. Thus the lower ends of the leads will receive a very slight underbend preventing them from falling away from the finger as the component is carried downwardly toward the board.

In this instance the anvil fingers which are used are also changed so that each anvil finger has two notches to accommodate the two leads 772 and 774 instead of the single notch. The anvil fingers otherwise are of substantially the same construction as fingers 530 and 532 and need not be described in detail.

The anvil fingers are easily changed by removing the entire anvil 636 as shown in Figs. 31 to 34 and replacing it with another anvil having the proper shaped fingers. This is done as illustrated in Fig. 31 by removing the snap washer 776 and slipping out the shaft 778 which supports the anvil on the frame of the head. This construction is also shown in Fig. 38. This shaft 778 is rotatably mounted in the frame and is keyed as shown at 780, Figs. 31 and 32, to lock the parts to it which will rotate with it.

Turning now to Fig. 46, the inserter of Fig. 42 is shown having descended onto the circuit board 132 and inserted the bent portion of the leads 660 and 662 into holes in the board.

The portion of the leads adjacent the body of the component 536 is still engaged by the fingers 656 and 658 to push the component tightly against the circuit board 132.

It will be noted from Fig. 46 where the bent portions 660 and 662 of the leads 622 and 623 are inserted into the holes in the circuit board, that the ends of the leads engage the plungers 782 and 784 of switches which are located generally at 786. These switches function to immediately stop the machine if either of the leads of the component is not properly inserted into the board and one of the switch plungers is not depressed. The switches will also act to turn on a signal light on the head which has caused the improper insertion. This operation will be fully described in connection with the circuit diagram of Fig. 53.

The physical position of this switch is shown in Fig. 17. The switch is supported on a plunger of a pneumatic cylinder 787 which raises the switch under the board 132 when the inserter descends. For this purpose the cylinder 787 is connected to the same air supply line as the inserter operating cylinder 562. When the inserter raises the switch 786 drops to permit the board 132 to be moved in.

Imperfect insertion or attachment of the component can occur from a number of reasons. If the hole is improperly formed in the circuit board 132, if the component leads are of improper length, or if one of the component leads is bent or missing, it will be apparent that the component will not function in its position in the circuit on the board. It will therefore be highly desirable to know that such a component is on the board or that a defective board is being used so that it may be discarded or repaired. Since it is absolutely necessary that both switch plungers 782 and 784 be fully depressed for the machine to continue operation, the operator will immediately know when a defective connection is being made and can remove the defective board, thus insuring that no boards delivered from the machine will have defectively mounted components.

In instances where a component having a double lead such as shown in Fig. 45 is used, it is important that both leads at both ends of the component be properly inserted.

To provide a safety device which will inform the operator when only one of the four leads of a twin lead component is improperly inserted, the unique switching arrangement of Figs. 47 and 48 is used. In Fig. 47 the component 680 is shown with the leads 772 and 774 properly inserted into the board. In this case, the switch plate 788 will be fully depressed to depress the plunger 790 and move the upper contact 792 of the switch 794 against the lower contact 796.

The switch plate 788 is pivotally mounted to swing about a pin 798. In the event only one lead is inserted, such as 800, or in the event that the other lead 802 is short, or if the hole in the board for the lead is out of place, it will be obvious from Fig. 48 that the switch plate 788 will pivot about the pin 798 rather than moving downwardly and the plunger 790 wil therefore not be depressed. The same situation may be seen from the dotted line position of the leads 800 and 802 which illustrates 800 as a short lead and illustrates the leads shifted too far to the right.

Therefore it will be seen that only if both leads are inserted into the circuit board and only if both leads are properly positioned and are of the proper length will the switch 794 be closed. The same type of switch is positioned at the other end of the component. Therefore if the switch at either end of the component is not closed, the machine will automatically stop, and as will be described in connection with Fig. 53, a light will appear on the turret head which has improperly inserted the component leads.

The switches 786 as shown in Fig. 17 are mounted directly beneath the conveyor so that the switch plunger will be beneath the holes in the board. The switches are suitably supported beneath the conveyor and their position is adjustable in order that they may be located beneath the holes in the circuit board where the component leads will be inserted.

Returning to Figs. 46 and 49, the bending fingers 512 and 514 are subsequently separated to release the component leads and the inserter is raised to the original position of Figs. 31 and 40. To accomplish the spreading of the fingers, when the inserter reaches the position of Fig. 46 against the circuit board, a plunger 664, Figs. 17, 50, and 51, lodges in a recess 666 on the back face of the plate 575 which is part of the second inserter member 574. This plunger 664 is biased outwardly by a spring 668 and is supported by the frame 670 at the lower end of the guide posts 568 and 570. This structural action is illustrated in detail in Fig. 51.

As the yoke 566 is raised the first inserter member 572 is also raised. The second inserter member would normally also begin to travel upwardly but it is desirable to prevent this by holding it in a fixed position and thus cause it to slide relatively downwardly on the first inserter member so that the fingers will spread and release the component. To accomplish this, the plunger 664 locks the second inserter member in its downward position so that it is drawn to its extended position or the position illustrated in Figs. 40 and 41 as the inserter member 572 raises. When that position is reached and the head 618 of the screw reaches the bottom of the slot 620, the second inserter member is raised with the first inserter member. The plunger 664 rides out of the recess 666. Thus the second inserter member will again be at its extended position and ready for operation as illustrated in Fig. 40.

In some instances the second inserter member may accidentally bounce or move to its retracted position when the head stops at its uppermost point of travel. This of course will cause the bending fingers to move together. To prevent the second inserter member from sliding upwardly relative to the first inserter member, a rod 669, Fig. 38, is located so that it will strike the second inserter member to shift it to its extended position. The rod extends through the yoke 566 and is loaded with a spring 671 to maintain it in the up position. When the inserter members and the yoke 566 rise, the upper end of the rod 669 strikes the plate 400 and the rod extension 673 pushes the second inserter 574 down if it is not already down. Thus on the return rise of the inserter, the operator is assured that the first and second inserter members will be in their proper relative positions and ready for a succeeding operation.

*Electrical circuitry*

The diagrammatic drawing of Fig. 53 illustrates the electrical circuitry for the machine. As will be noted, the wiring diagram for only one head is shown with the leads A, B, C, and D leading to the heads 2 through 24. Each of the heads is wired in parallel and wired the same as head No. 1. Therefore only this head need be described.

At the top of the drawing the electrical supply leads are shown. The motor is supplied with 220 volts, three phase, 60 cycle, current which is supplied by leads labelled L–1, L–2, and L–3. The control system for the motor and for each of the heads, the board turret, and component turret is operated by, single phase power supplied through leads L′–1 and L′–2.

The Motor as labelled is connected to the Gear Train as labelled. The cam shaft which rotates the cams is indicated by the dotted lines. This arrangement is illustrated in full in Fig. 4 where the cams are numbered 286 and 496. The motor is connected to the gear train through the clutch shown at 102 in Fig. 4 and indicated by the solenoid B–2 in Fig. 53.

In the schematic diagram, in most instances solenoids are indicated by a solid line drawn through a schematic coil while the relays are indicated by dotted lines drawn through a schematic coil. The solenoids have the prefix B and the relays have the prefix K, switches operated by the relays also having the prefix K. The manual and machine-operated switches have the prefix S.

The operation of the electrical circuitry will be described in connection with the steps of operating the machine.

To start the motor, the switch labelled Control Power, S–8 is first turned to the On position. This supplies power to the controls for the entire machine as well as to the motor controls. To then start the motor, the push button switch labelled Motor Start is closed. This closes the circuit through the relay coil 904 to thereby close the relay switches 906 to the 220 volt line and to close relay holding switch 908, switches 906 and 908 being operated by relay coil 904. Holding switch 908 will keep switches 906 closed until the stop switch 910 is depressed to break the circuit and release the relays. Additional switches 905 may be added in the relay coil 904 circuit, these being thermal switches which will automatically open if the motor overheats.

At this point the motor is running but is not connected to the gear train since the clutch B–2 is not engaged. When the motor begins operation, the air pressure for the machine will begin to build up and the pressuretrol switch S–10 will close to bring power to the other control switches. Failure of air pressure will of course automatically open the pressuretrol switch causing the machine to stop. Pressurized air for operating the machine may be obtained from a compressor (not shown) operated by the main drive motor or from an auxiliary compressor.

To start the machine to cause the conveyor to begin moving and the heads to begin inserting, the Start switch S–2 is manually depressed. When the switch S–2 is closed the relay K–3 is energized. This is the primary relay which remains closed during operation. K–2 is the secondary relay which closes for each cycle of the inserter. K–1 is primarily the safety relay.

Energization of relay K–3 operates three switches with switch K–3, 914, being closed to complete the circuit through the clutch B–2 to thereby connect the motor to the gear train and cause the conveyor to begin operating and to cause the cams 286 and 496 to begin rotating. Another switch K–3, 916, closes so that whenever S–3 is closed, the circuit will be made complete through relay coil K–2. The operation of this relay K–2 will be explained later. Switch K–3, 916, also closes to complete the circuit to B–1 Up (through normally closed K–2, 925) which is the solenoid switch for holding the inserter head in the up position.

Another switch K–3, 918, closes to complete the holding circuit through relay K–3. The circuit to this relay is completed through both normally closed switches S–4 and/or K–2, 920. It is this circuit which will be open to break the circuit through relay coil K–3 to stop the machine by opening switch 914 in the event a component is not properly inserted. This action will be explained later.

Returning now to the operation of the machine, after the circuit has been completed through relay K–3 and the cam 286 begins to rotate, it reaches the point where it closes the switch S–3. At this point the circuit is completed through K–3, 916, and S–3 to close relay K–2. This relay opens normally closed switch K–2, 925, to break the circuit through solenoid B–1 which holds the head in the up position. Relay K–2 also closes switch K–2, 922, to complete the circuit to B–1 Down, the solenoid which causes the head to descend. Switch S–6, 198, is, of course, closed since, the board which has been positioned in front of the turret at the attaching station has depressed the switch arm. The physical position of S–6 is shown in Figs. 6 and 7 and the switch is therein numbered as 198. S–6 has two contacts, one normally closed and one normally open, as will be seen in Fig. 53.

It will be observed at this point that if no board is present at the attaching station the normally open contacts of switch S–6, 198, will not be closed and the head will not descend. This is true for each of the heads individually and if any of the heads has no board in position, that head will not insert but the others will operate.

The solenoid B–1 Down in addition to supplying air to the air cylinder 562 of Fig. 17, admits air to the pneumatic cylinder 787, which functions to hold the switch 786 up against the bottom of the circuit board. The down solenoid B–1 Down releases air from this cylinder 787 to move the switch away from the board and permit the board to be moved on to the next attaching station.

The cam 286 continues rotating until switch S–3 releases to open, thus breaking the circuit through relay K–2 and opening the K–2 switch, 922, to break the circuit to solenoid B–1 Down and to reclose the normally closed K–2 switch, 925, to close the circuit to B–1 Up which causes the inserter head to rise.

The head has just completed its cycle. During the time of the cycle, however, several conditions are present and several other events are occurring which would have an effect on the action of the machine if the machine were not operating properly.

Switch S–4, 494, operates as a failure detection switch to shut down the machine if a component is not properly inserted.

The failure detection switch S–4 is a normally closed switch which opens once on each revolution of the cam 496 just after switch S–3 is reopened by cam 286. When switch S–4 again opens, the holding circuit to relay K–3 will be broken unless the switch K–2, 920, is closed.

If the component is properly inserted, the two switches S–5, 786, will close, completing the circuit through relay K–1 to cause its switches to operate. When relay K–1 closes, switch K–1, 924, closes to form a holding circuit for relay K–1. The normally closed contact of switch S–6, 198, is opened when a board is at the head so this is not available to close the circuit.

Normally closed switch K–1, 926, opens to break the circuit to K–2 if the leads are properly inserted. If K–1, 926, is opened, relay K–2 will drop out as it should when S–3 opens. If, however, K–1, 926, remains closed, relay K–2 will remain energized and normally closed switch K–2, 920, will be opened when normally closed failure-detection switch S–4 opens. This of course will leave no holding circuit for relay K–3 and it will drop out opening switch K–3, 914, to disengage the clutch and stop the machine.

It will be seen of course that if there is no board at the attaching station, the component would not be brought down since B–1 Down would not operate and of course neither of the S–5 switches would close. The machine would shut down if it were not for the normally closed S–6 which operates relay K–1 in the absence of closing switches S–5. Thus, when there is no board present, normally closed S–6 causes relay K–1 to operate just as if component leads were properly inserted and the S–5 switches were closed and the absence of a board at a station will therefore not stop the machine.

Returning to the case where leads are improperly inserted, the fact that relay K–1 is energized because the component leads were not properly inserted to close both switches S–5, causes switch K–1, 928, to remain closed, lighting the light NE–51. This light will be lit only on the head which has improperly inserted the component leads. Therefore the operator will be immediately able to tell which head has made a defective attachment since the lights on the other heads will go out when K–1, 928, opens on these properly operating heads.

The next function of the circuit is to operate the component turret when the components are exhausted. The solenoid valve B–3 of the component turret is so constructed that when the solenoid is not energized, the pressure is on the cylinder to hold the magazine in position in the condition illustrated in Fig. 21. When the solenoid is energized by the closing of S–7, 470, as occurs when pin 464 engages switch arm 468, Fig. 24, the valve is operated to cause the pusher arm 486 and 422 to pivot to engage a new tooth in the sprocket 482, Fig. 22. As soon as switch K–2, 922, again opens, Fig. 53, the solenoid will be deenergized, indexing the magazine turret back to bring a new magazine into position.

The board magazine turret operates through the switch S–9, which is shown in Fig. 11 as switch 208. This switch, which is normally closed, is opened each time a board depresses the switch arm 210. Therefore the circuit through solenoid B–4 is not normally completed when the switch K–2, 922, is closed. The solenoid valve is so constructed that the arm 248 is held against the ratchet wheel 246 when the solenoid is not energized, Fig. 11. If, however, a board does not pass over the switch 208, indicating that the magazine is empty, the circuit will be completed through S–9 to the solenoid, Fig. 53, and the indexing pusher arm 248 will be caused to swing back to engage a new tooth on the index wheel 246. When the circuit is again broken by the opening of the switch K–2, 922, the solenoid 134 will again pressurize the cylinder 258 to cause the turret to index to bring a new magazine into place.

It will be realized, of course, that since the absence of a board from the conveyor is required to cause the turret to index, that each time a magazine indexes there will be an empty space on the conveyor. The inserter heads, however, will not operate in the empty space since the normally open switch S–6, 198, prevents this operation in the manner previously described.

Thus it will be seen that we have provided an improved automatic attaching machine for attaching or mounting electrical components to a printed circuit board. The machine is extremely reliable in that very rugged parts may be used since a complete mechanism is provided for each component to be inserted. The mechanisms are all similarly designed and therefore interchangeable parts can be used, thus reducing the cost of manufacture and operation.

In addition to achieving ruggedness and reliability by using as many attaching heads as there are components to be attached, the machine also achieves great adaptability to be used on any type of circuit because the number of components to be attached can be varied merely by changing the number of heads used. Further, the attaching position of each component is changed by adjusting the position of each head. Therefore minor maladjustments will not affect the attaching operation of all the components and they can be easily corrected in one head without affecting the remaining heads.

Since one head is provided from each component, the sequence in which the components are attached can be varied and as a result the machine is completely adaptable to most any operation.

Each individual attaching head is in itself simply and ruggedly built so that it may be used in continuous operation for an indefinite period of time. The circuit boards and components can be used just as they are received from the supplier. No special adaptation or preparation is necessary. The components are positively and quickly handled and the possibility of damaging individual components is reduced to a minimum. In insertion the leads are rapidly bent and positively inserted into the board with the possibility of the component being dropped during handling being eliminated.

In the event some imperfection occurs in the attaching operation, possibly due to a defective board or component, the machine is automatically stopped to prevent waste of materials and damage to the machine. Further, the safety devices make it possible to quickly locate the defective operation and the machine can be put back into production with the extreme minimum of lost time.

We have, in the drawings and specification, presented a detailed disclosure of the preferred embodiments of our invention. It is to be understood that the invention is susceptible of modifications, structural changes and various applications of use within the spirit and scope of the invention and we do not intend to limit the invention to the specific form disclosed but intend to cover all modifications, changes and alternative constructions and methods falling within the scope of the principles taught by our invention.

Now therefore we claim:

1. A machine for mounting electrical components on a circuit board comprising a conveyor carrying a series of individual circuit boards along a path, a plurality of component attaching heads arranged adjacent the path and operable to attach components to the circuit boards when they are positioned opposite the attaching heads, means for driving the conveyor with an intermittent motion to move the circuit boards from head to head to receive electrical components, stop members for positioning the circuit boards with respect to the individual heads, means for moving the stop members into the path of the circuit boards just before the conveyor is stopped, a board pusher finger pivotally attached to the conveyor to engage the board and carry it with the conveyor against said stops, and a finger biasing spring attached to the conveyor and engaging the finger with a resultant force acting through the pivotal point of said finger normal to the force between the finger and circuit board, said finger having a spring engaging surface conforming to the surface configuration of the spring so that the spring tends to hold the finger in board-engaging position and permits the finger to move resiliently as the board engages said stop.

2. A machine for attaching electrical components to a circuit board comprising conveyor means for pushing a series of individual circuit boards along an attaching path, attaching stations along said path with an attaching head mounted at each of said stations, means for intermittently moving the conveyor means to move the boards between attaching stations, means to supply a plurality of boards to the receiving end of the board pushing means, a board-stopping arm for each attaching station, a rotatable shaft extending parallel to the path of movement of the boards and carrying said board-stopping arms, means to rotate said rod to simultaneously move the arms into the path of the board to stop said boards at the attaching stations and to subsequently move the arms out of the path of the boards to permit them to be pushed to the next succeeding station.

3. A mechanism for attaching electrical components to a circuit board comprising a conveyor for carrying a series of individual circuit boards along a component attaching line, component attaching heads spaced along said line to attach the components to the boards as they are stopped adjacent said heads, drive means for the conveyor for intermittently moving the circuit boards between heads, board-positioning stops movable into the path of the boards to stop them opposite the conveyor heads, operating means for said stop members to operate the members in unison, a magazine for supplying individual circuit boards to the conveyor, release means operating to release individual boards to the conveyor, and trip means for operating said release means to drop the board, said trip means operatively connected to said stop-operating means to fix the position of the boards on the conveyor to insure that the stops will move into the path of the boards between the boards on the conveyor.

4. A machine for attaching electrical components to a circuit board comprising a conveyor for moving a series of circuit boards through successive component attaching stations, component attaching heads positioned at said stations to attach electrical components to the boards, a rotatable shaft extending parallel to the conveyor, stop members secured to the shaft to be pivotal therewith between a stop position in the path of the circuit boards and a free position out of the path, said stop members positioned at each of said attaching stations, a magazine for carrying a supply of circuit boards to be fed to the conveyor, release means for feeding individual boards to the conveyor, a tripping arm adapted to engage said release means to release the circuit boards, said tripping arm being secured to the rotatable shaft so that the release means will be simultaneously operable with the stop member to drop a new board each time the stop members release the boards on the conveyor.

5. A machine for attaching electrical components to a circuit board comprising conveying means for carrying a series of individual circuit boards through a series of attaching stations, component attaching heads mounted at each station to attach the components to the board by inserting the leads into openings in the board, a magazine for circuit boards positioned above the receiving end of the conveying means to deposit individual boards at spaced intervals on the conveyor, the magazine having a central opening shaped corresponding to the circuit board to freely contain a stack of boards, cam means located at opposite sides of the bottom of the magazine opening to support the stack of boards, said cam means being mounted for pivotal movement about their axes to drop individual circuit boards and having a recess to receive the edges of the board, means for simultaneously rotating the release cams on each side of the stack of circuit boards in one direction to receive the board, and means for rotating the cams in the opposite direction to drop the board.

6. A machine for attaching electrical components to a circuit board comprising a plurality of attaching heads arranged along a path and each adapted to attach individual components to a circuit board by inserting the component leads into holes in the boards, a conveyor for carrying the circuit boards past the attaching heads, guide rails for guiding the path of travel of the circuit board as it is moved by the conveyor, means to intermittently drive the conveyor to move the circuit boards to the conveyor heads, a magazine for supplying circuit boards, said magazine being positioned above the receiving end of the conveyor to deposit individual circuit boards on the conveyor, release means at the bottom of the magazine to drop individual circuit boards onto the conveyor, and centering guides automatically positioning the dropped component boards with respect to the guide rails so that the conveyor will carry the boards between said rails.

7. A machine for attaching electrical components to a circuit board comprising a conveyor for moving a series of circuit boards past a plurality of attaching stations, component attaching heads positioned at said stations and operative to insert the leads of the components into holes in the circuit boards as they are positioned in said stations by the conveyor, power means for driving the conveyor, a plurality of board supporting magazines for feeding individual circuit boards to the conveyor, means for supporting said magazine to position individual supply magazines over the receiving end of the conveyor, means to move said magazine supporting means to position a fresh magazine over the conveyor when the supply magazine is empty, said moving means including a ratchet engageable by a pawl, the pawl being operable by a cylinder and piston attached thereto, and switch means positioned in the path of the conveyor and operating said piston and cylinder to move the magazine supporting means and move a fresh magazine over the conveyor when the switch is not engaged by a board and the supply magazine is empty.

8. A machine for attaching electrical components to a circuit board comprising a conveying means for moving a series of individual circuit boards to a plurality of component attaching stations, attaining heads positioned at each of said stations and adapted to attach individual electrical components to the boards by inserting the leads into openings in the boards, means to drive the conveyor for intermittently moving the boards to the attaching stations, means for operating the attaching heads at each of the attaching stations, a plurality of board magazines positioned at the receiving end of the conveyor with a supply magazine positioned over the conveyor to deposit the individual circuit boards thereon, release means adapted to release individual circuit boards from the magazines to deposit them on the conveyor, driving means for said release means being disengageably connected to said release means, and means to move the board magazine to position a new magazine over the receiving end of the conveyor with the release drive means automatically disengaging itself from the supply magazine which automatically moves to operative engagement with the new magazine which is moved over the conveyor.

9. A machine for attaching electrical components to a circuit board comprising a conveyor for carrying individual circuit boards along an attaching path, attaching heads mounted at attaching stations along said path, means for intermittently driving the conveyor to move the circuit boards to said attaching stations, means operating said attaching heads simultaneously to cause them to insert the component leads into holes in the circuit boards, a plurality of magazines carrying a supply of circuit boards to be delivered to the conveyor, a rotatable turret platform arranged to carry the magazines and to position individual magazines above the conveyor, and means for rotating the turret to position a new magazine above the conveyor chain when the last circuit board has been delivered from the magazine in position over the conveyor.

10. A machine for attaching electrical components to a circuit board comprising means for supporting a circuit board in component attaching position, an attaching head positioned adjacent the circuit board, an inserter member supported on the attaching head for moving a component against the circuit board and inserting component leads into holes in the board, means to move the inserting member against the board, means for feeding individual components to the inserter, a magazine positionable in supplying relationship to said feeding means, a blocking member at the lower end of the magazine to prevent the components from falling from the magazine, means for automatically removing said blocking member from the lower end of the magazine to permit the components to flow to the feeding means when the magazine is positioned in supplying relationship to the feeding means, and means for maintaining the magazine in said supplying relationship to the feeding means until empty.

11. A machine for attaching electrical components to a circuit board comprising means for positioning a circuit board at a component attaching station, an attaching unit positioned adjacent said station, an inserter supported on the attaching unit, the inserter being movable against the circuit board to insert component leads into holes in the circuit board, means to move the inserter against the circuit board, a plurality of magazines adapted to feed components to the inserter, a support for said magazines being movable to successively position the magazines in feeding relationship to the inserter, a blocking arm normally positioned to block the lower end of the magazine to prevent the components from dropping from the magazine, cam means positioned to engage said arm and move the arm out of the path of the components in the magazine to permit them to move downwardly toward the inserter when the support is moved to position a magazine in feeding position, and means to keep the individual magazine in said feeding relationship until empty.

12. A machine for attaching electrical components to a circuit board comprising means for supporting a circuit board in component attaching position, an attaching head adjacent the circuit board, an inserter mounted on the head movable against the circuit board to insert the component leads into holes in the board, an anvil member having a pair of spaced anvil fingers on which the component rests so that the inserter may bend the leads against the anvil fingers and carry the component toward the circuit board, means to feed a component onto the anvil, and a component restraint element secured to the inserter member and positioned to have a restraining surface between the anvils to block the component body and prevent the component from inadvertently moving off the anvils when deposited thereon by said feeding means.

13. A machine for attaching electrical components to a circuit board comprising means for supporting a circuit board, an attaching unit positioned adjacent the board, an inserter member operable to insert the ends of the component leads into holes in the circuit board, an anvil member having spaced component lead supporting anvil fingers past which the inserter moves to bend the component leads and carry the component against the circuit board, means for moving the inserter downwardly against the circuit board, guide members positioned between the spaced anvils to engage the body of the component and guide it into position on the anvil fingers, and means to feed a component to the spaced anvils.

14. A machine for attaching electrical components to a circuit board comprising means for positioning a circuit board at a component-attaching station, an inserter located at the station and movable against the circuit board to insert component leads into holes in the board, a pair of spaced anvil members positioned to support the component with the leads resting on the anvil members, means to move the inserter down past the anvil to bend the component leads toward the board, a feeder positioned above the anvil members for dropping individual leads onto the spaced anvil members, and a pair of sloping guide surfaces positioned on each side of the anvil members and tapering toward the members to engage the ends of the component leads as they are dropped on the anvil members and center them thereon.

15. A machine for attaching electrical components to a circuit board comprising means for supporting a circuit board in a component-attaching position, an inserter positioned above the circuit board and operable to insert component leads into holes in the circuit board, a pair of anvil fingers for supporting the component leads, means to move the inserter past the anvil fingers to bend the component leads toward the circuit board, a feeder holding a supply of components to be individually dropped onto the anvil fingers, means for releasing individual components to the anvil, and a pair of inclined rails extending between the feeder and the anvil to guide the components onto the anvil fingers from the feeder.

16. A machine for attaching electrical components to a circuit board comprising an inserter member movable downwardly against the board to insert the ends of component leads into holes in the board, an anvil member operable to support the component so that it may be engaged by the inserter to bend the leads toward the board, a pair of bending and carrying members supported on the inserter, said bending members having surfaces which engage the component leads to bend them against the anvil, and concave surfaces on the bending members facing the component in component lead-engaging position so that the leads of the component will project into said concave surfaces to prevent the component from being dropped by said members after the leads are bent and the component is no longer supported by the anvil.

17. A machine for attaching electrical components to a circuit board comprising means for positioning a circuit board at a component-attaching station, an attaching head positioned at said station, an inserter mounted on said attaching head and movable against the circuit board to insert the ends of component leads into holes in the circuit board, an anvil member for supporting an electrical component while the leads of the components are being bent toward the board, a pair of component-engaging elements mounted on the inserter and adapted to bend the component leads against the anvil and carry the component toward the circuit board, said elements having a pair of concave grooves facing toward the component and anvil, the component leads being held in said concave grooves after being bent to prevent the component from falling from said elements.

18. A machine for attaching electrical components to a circuit board comprising means for supporting a circuit board in component-attaching position, an inserter adapted to be moved toward the circuit board to insert the ends of the component leads into holes in the board, means to move the inserter toward the circuit board, an anvil member adapted to support the component in the path of the inserter so that the leads of the component are bent against the anvil, a pair of component bending elements supported on the inserter, and means to move said bending elements toward each other after they have engaged the component leads to bend said leads inwardly, said leads being inserted into the board after being bent against the anvil.

19. A machine for attaching electrical components to a circuit board comprising support means for a circuit board, an anvil for supporting the component while the leads are being bent, an inserter mechanism positioned above the support means to insert the leads of an electrical component into holes in the circuit board, the inserter including a first member, and a second member slidable thereon, bending fingers movably mounted on the second inserter member and adapted to be moved together to bend the component leads inwardly, a cam member on the first inserter member positioned to engage the movable bending members and cause them to move toward each other when the second inserter member has movement relative to the first, and means to cause said relative movement after the bending members have engaged the component leads to move the bending fingers together to bend the leads, and means to move the inserter assembly downwardly past the anvil and against the circuit board to insert the bent leads into holes in the board.

20. A machine for attaching electrical components to a circuit board comprising a support for a circuit board, an inserter assembly positioned above the circuit board comprising a first and second inserter member, an anvil for supporting a component while the component leads are being bent, means to move the first inserter member downwardly past the anvil against the circuit board to insert the component leads into holes in the circuit boards, said second inserter member being slidably mounted on the first inserter member, means to limit the relative sliding movement between the first and second inserter member, a pair of lead bending and supporting fingers pivotally mounted on the second inserter member, said fingers having cam follower surfaces, a cam secured to the first inserter member with cam surfaces engaging the follower surfaces of the fingers and adapted to move the fingers together when the second inserter member is raised relative to the first inserter member, means biasing the fingers to spread position, a stop member positioned to be engaged by the second inserter member after the fingers have engaged the component leads supported by the anvil, the stop member causing the second inserter member to slide upwardly relative to the first inserter member while said moving means is moving the first inserter toward the circuit board with the cam engaging surfaces of the fingers moving along the cam surfaces to move the fingers together to bend the component leads inwardly.

21. A machine for mounting electrical components on a circuit board comprising means for positioning and supporting a circuit board in component-receiving position, a component inserter positioned above the board and adapted to insert the leads of a component into holes in the board, an anvil for supporting a component in the path of the inserter while the leads are being bent, bending fingers mounted on the inserter member, means to move the inserter member downwardly toward the circuit board past the anvil to cause the fingers to bend the leads and move the component against the board to insert the leads therein, means to move the anvil out of the path of the inserter after the leads have been bent, and means to move the bending fingers toward each other to bend the component leads inwardly after the leads have been engaged by the fingers and bent downwardly, said fingers having concave facing grooves for receiving the bent component leads to support the component while it is being carried to the circuit board to insert the leads into the board.

22. A machine for attaching electrical components to a circuit board comprising means for supporting a circuit board for receiving an electrical component to be mounted thereon, an inserter member positioned opposite the board to bend the leads of an electrical component and insert the ends into holes in the board, an anvil member for supporting the component while the leads are being bent, opposed lead bending fingers mounted on the inserter member, means to move the inserter member toward the circuit board past the anvil to cause the fingers to bend the leads and move the components against the circuit board to insert the bent leads into holes in the board, means to move the lead bending fingers toward each other to bend the component leads inwardly after the fingers have engaged the component leads to bend them toward the circuit board, the fingers having concave surfaces facing the component to support the bent leads of the component, and means to again spread the fingers and move them away from the component while the inserter is holding the component against the circuit board, and means to subsequently move the inserter away from the circuit board.

23. A machine for attaching electrical components to a circuit board comprising a support on which a circuit board may be positioned, a component attaching mechanism adapted to carry the components to the circuit board and to insert the leads into holes in the board, bending elements operatively associated with the attaching mechanism and adapted to be moved against the component leads with the attaching mechanism including means to bend the leads toward the circuit board, and means to bend the leads inwardly toward the component body to an amount wherein the distance between the ends of the leads is less than the length of the component body, and means to move the attaching mechanism toward the circuit body to insert the bent leads into holes in the circuit board.

24. A machine for attaching electrical components to a circuit board comprising means for positioning a circuit board in a component-attaching position, an inserter member positioned to insert the component leads into holes in the circuit board, an anvil for supporting the component while the leads are being bent, fingers mounted on the inserter and adapted to bend the leads against the anvil member and subsequently carry them against the board to insert the ends of the leads into the holes in the board, said fingers having curved ends projecting inwardly toward each other and toward the component body, means to move the inserter and the fingers toward the circuit board to bend the component leads against the anvil, and means to move the fingers inwardly toward each other after the component leads have been bent downwardly, the fingers moving together to a position where the ends of the curved fingers are a distance apart less than the length of the component body so that the component leads may be inserted into holes which are closer together than the length of the component body.

25. A machine for attaching electrical components to a circuit board comprising a support for the circuit board, an inserter member mounted above said support to carry the components against the circuit board and insert the ends of the leads into holes on the circuit boards, an anvil for supporting the components while the leads are being bent, lead bending elements on the inserter member for engaging the leads of the components while they are supported by the anvil, an inclined feeder positioned above the anvil to deposit individual components thereon, a release element projecting into the path of the components and blocking the descent of the lowermost component on the feeder, means to move said inserter member downwardly to bend the component leads against the anvil and carry the component against the circuit board, means synchronized with the movement of the inserter member and operable to move the release element out of the path of the foremost component to deposit it on the anvil after the leads of the component which was previously on the anvil have been bent and to move the release element back into the path of the succeeding electrical component.

26. A machine for attaching electrical components to a circuit board comprising a support on which a circuit board may be positioned, an inserter member positioned above the support and adapted to carry an electrical component against the circuit board to insert the ends of component leads into holes in the circuit board, an anvil member for supporting the component while the leads are being bent, means mounted on the inserter member for bending the component leads against the anvil, means for moving the anvil out of the path of the inserter member after the leads have been bent, a feeder supplying successive electrical components to the anvil, said feeder being inclined so as to feed the components gravitationally, and holding fingers projecting into the path of the electrical components on the feeder, said fingers being secured to the anvil and movable therewith so that the fingers move out of the path of the components when the anvil moves out of the path of the inserter, means to move the inserter past the anvil to project the component leads into holes in the circuit board, and means to move the anvil out of the path of the descending inserter after the leads of the component have been bent against the anvil.

27. A machine for attaching electrical components to a circuit board comprising a support for a circuit board, an inserter member having a first element and a second element slidably secured thereto and slideable between an extended and a retracted position, means for moving the inserter toward a circuit board to insert the ends of component leads into holes therein, an anvil member for supporting an electrical component while the leads of the component are being bent, bending fingers movably mounted on the second inserter element, cam means provided for closing the bending fingers to bend the component leads together and operable with relative movement of the second inserter member to the retracted position on the first inserter member, a latching member operable to temporarily catch the second inserting element when the inserter has moved the component against the circuit board, and means to move the first inserter member away from the circuit board after the component has been inserted, the latch member temporarily holding the second inserter member and moving it to retracted position relative to the first inserter member as it is moved away from the board and automatically releasing when the second inserter element reaches extended position and is moved with the first inserter member.

28. A machine for attaching components to a circuit board comprising a support for locating a circuit board in component-attaching position, an inserter member for bending the leads of an electrical component and inserting the leads into holes in the circuit board, the inserter including a first element and a second element movably mounted thereon, means for carrying the first element of the inserter downwardly against the circuit board and carrying the second inserter element therewith, an anvil for supporting an electrical component while the component leads are being bent, bending elements mounted on the second inserter element and adapted to move against the component leads and together toward the component to bend the leads inwardly, cam means associated with the first inserter element adapted to move the bending elements toward the component when the second inserter element is moved to the retracted position with respect to the first inserter element, and means to temporarily block the downward motion of the second inserter to cause said second inserter element to move to retracted position when the first inserter element is descending to thereby cause the bending elements to move together, means to move the inserter downwardly against the circuit board, and means to temporarily lock the second inserter element after the inserter is against the circuit board and the first inserter element is being raised to cause the second inserter element to move to extended position and to move the bending elements away from the component to release it and means to raise the inserter to move the inserter elements away from the circuit board.

29. A machine for attaching electrical components to a circuit board comprising means for positioning a circuit board at a component-attaching station, an inserter member located at said station and adapted to insert the ends of the leads into holes in the circuit board, an anvil member supporting the electrical component while the leads are being bent by the inserter member, the anvil having convex sides against which the component leads are pressed, means associated with the inserter to bend the component leads against the sides of the anvil to form a bulge in the bent leads around said convex sides, and means to move the inserter past the anvil to cause said bending means to bend the component leads and to carry the component to the circuit board to insert the leads in the holes.

30. A machine for attaching electrical components to a circuit board comprising a support for circuit boards, an inserter positioned to move a component against the circuit board to insert the leads into holes in the board, an anvil for supporting the component while the leads are being bent, said anvil having raised side shoulders so that the leads may be pressed thereagainst, and bending elements associated with the inserter, the bending elements having concave surfaces facing the raised sides of the anvil so that the component leads may be bent over the curved sides and forced into the concave surfaces of the bending members to support the components while they are being carried to the component board by the inserter.

31. A machine for attaching electrical components to a circuit board comprising a component attaching station whereat a circuit board is supported for attaching an electrical component thereto, a component attaching mechanism for carrying the component against the circuit board and inserting the ends of the component leads into holes in the board, an anvil member for supporting the electrical component so that the leads may be bent, bending elements operatively associated with the attaching mechanism and adapted to bend the component leads against the sides of the anvil, the anvil sides having a first convex raised area adjacent the component lead on each side of the anvil and a subsequent flattened portion adjacent the raised portion, and means to move the bending elements against the leads to force them against the sides of the anvil so that the portions of the leads adjacent the convex raised area of the anvil will be curved and the portion of the leads adjacent the flat portion of the anvil will be straight and project toward the component board, and means to move the attaching member and its associated bending elements against the circuit board to insert the component leads into holes in the board.

32. A machine for attaching electrical components to a circuit board comprising support means for a circuit board, an inserter member positioned above the support means and adapted to carry a component toward the circuit board and insert the ends of the component leads into holes in the circuit board, bending fingers mounted on the inserter member for engaging the component leads and bending them downwardly to point toward the circuit board, anvil members supporting the electrical component by its leads, the bending fingers having projecting ends which extend beneath the electrical component in closed position, means for moving the fingers together from open to closed position after the fingers have descended with the inserter to bend the component leads downwardly, vertical bending surfaces facing outwardly and positioned beneath the component body inside of the ends of the component body so that the leads may be forced thereagainst by the extending fingers to cause the leads to project vertically downwardly toward the circuit board, and means to move the inserter and the bending fingers downwardly and against the circuit board to insert the ends of the component leads into the board.

33. A machine for attaching electrical components to a circuit board comprising, an endless conveyor for moving a series of individual circuit boards along a path, a component attaching head positioned beside said path, a board pushing finger pivotally connected to the conveyor and having a board pushing position and a non-board pushing position, means holding the finger in pushing position and permitting the finger to move to non-pushing position with a predetermined resistance against the finger, and means for returning the finger to pushing position with each complete cycle of the endless conveyor.

34. A machine for attaching electrical components to a circuit board comprising conveying means for carrying a series of individual circuit boards through a series of attaching stations, component attaching heads mounted at each station to attach the components to the board by inserting the leads into openings in the board, a magazine for circuit boards positioned above the receiving end of the conveying means to deposit individual boards at spaced intervals on the conveyor, the magazine having a central opening shaped corresponding to the circuit board to freely contain a stack of boards, cam means located at opposite sides of the bottom of the magazine opening to support the stack of boards, said cam means being mounted for pivotal movement about their axes to drop individual circuit boards, and means for simultaneously operating the release cams on each side of the stack of circuit boards, said cams having a notch facing the stack into which the lowermost board drops when the cams are rotated in a first direction and having a smooth surface above the notched portion which will slide beneath the succeeding circuit boards when the cams are rotated in the opposite direction to turn said notches downwardly to release the lowermost board and drop it on the conveyor.

35. A machine for attaching electrical components to a circuit board comprising an anvil for supporting the component while the leads are being bent, an inserter member for carrying the component against a circuit board to insert the leads therein, bending members carried on the inserter to bend the leads over the anvil, and means for positively gripping the leads beside the component body while the leads are being bent.

36. A machine in accordance with claim 35 in which the gripping means includes a support for the leads carried on the anvil, gripper members which have resilient faces, and means to force the gripper members against the leads forcing them against the support.

37. A machine in accordance with claim 36, in which the gripper members have a spring biasing means to force them against the support, and locking means are provided to hold the gripper member against movement after the component leads are bent.

38. A mechanism for feeding and straightening electrical components comprising, a pair of spaced guide members for passing the body of an electrical component therebetween, passageways formed in each of the guide members for passing the leads of the components, each passageway formed of a series of straight slots with each succeeding slot being at an angle to the previous slot and inclined downwardly to cause the component to gravitationally move downwardly.

39. A mechanism for feeding and straightening electrical components comprising a pair of guide members spaced apart a distance greater than the length of the component body but less than the length of the component body plus the length of one of the component leads so that the body of the component may pass between the guides and passageways formed in each of the guides for the component leads, the passageways formed of a series of successive slots with each preceding slot leading downwardly into the succeeding slot, and each succeeding slot being at an angle to the previous one, the width of each slot becoming progressively wider from the inside adjacent the component body between the guides to the outside of the slot near the end of the component lead.

40. A mechanism for attaching components to a circuit board comprising, a conveyor for moving a plurality of circuit boards through a series of attaching stations, attaching heads positioned at each of the attaching stations, an inserter mounted on each of the attaching heads to carry a component against the circuit board and insert leads into the hole therein, separate inserter operating means for each of the inserters, control means for causing simultaneous operation of each of the inserter operating means to cause all of the inserters to descend simultaneously, and separate means at each of said attaching stations responsive to the presence of a board and operably connected to the inserter operating means for the corresponding attaching head to prevent operation of the individual inserter operating means at the station which has the absence of a board.

41. A mechanism for attaching components to a circuit board comprising means for positioning a board at an attaching station, an attaching head positioned at said station, an inserter mounted on the attaching head to carry a component against the board and insert leads into holes in the board, inserter operating means causing the inserter to descend against the board in the attaching station, and means responsive to the presence of a board and being attached to the inserter operating means and preventing operation of the inserter in the absence of a board from the attaching station.

42. A mechanism for attaching electrical components to a circuit board comprising, means for positioning a circuit board in an attaching position, an inserter for inserting the leads of a component into holes in the circuit board, lead bending means mounted on the inserter, said bending means curving the leads away from the axis of the component body and bending the lead tips toward each other with said tips closer together than the curved bent portions of the leads, and inserter operating means for moving the inserter toward the circuit board.

43. A mechanism for attaching electrical components to a circuit board comprising means for positioning a circuit board at an attaching station, an attaching head at said station, an inserter member mounted on the attaching head, means to move the attaching head against the circuit board, a pair of bending fingers pivotally mounted on the inserter for bending the leads inwardly to a degree determined by the shape of the fingers, and a pivotal connection secured to the inserter for removably mounting the bending fingers, said fingers being interchangeable with alternate pairs of bending fingers having different shapes to impart different bends to the component leads.

44. A mechanism for attaching electrical components to a circuit board comprising a conveyor for carrying a series of boards through an attaching station, an attaching head positioned at said station for inserting the component leads into a board, a plurality of magazines for delivering individual boards to the conveyor, a support for the magazines movable to carry a new magazine into feeding position when a magazine is empty, means for actuating said support and means responsive to the presence of a board positioned in the path of the conveyor and connected to said support actuating means to move the support when a board is not present on the conveyor to move a new magazine into feeding position.

References Cited in the file of this patent

UNITED STATES PATENTS

| | | |
|---|---|---|
| 1,344,441 | Christensen | June 22, 1920 |
| 1,381,617 | Craig | June 14, 1921 |
| 1,534,141 | Roesen | Apr. 21, 1925 |
| 1,555,378 | Labombarde | Sept. 29, 1925 |
| 1,791,081 | Seiter | Feb. 3, 1931 |
| 1,859,951 | Blevney | May 24, 1932 |
| 2,080,462 | Cranston | May 18, 1937 |
| 2,139,403 | Cole | Dec. 6, 1938 |
| 2,278,013 | Nicholson | Mar. 31, 1942 |
| 2,392,349 | Webb | Jan. 8, 1946 |
| 2,497,748 | Von Stoeser | Feb. 14, 1950 |
| 2,512,162 | Lips | June 20, 1950 |
| 2,540,106 | Eichelberger | Feb. 6, 1951 |
| 2,569,355 | Tubbs | Sept. 25, 1951 |
| 2,690,562 | Cootes | Oct. 5, 1954 |
| 2,777,126 | Muller | Jan. 15, 1957 |

FOREIGN PATENTS

| | | |
|---|---|---|
| 125,561 | Germany | Nov. 28, 1901 |

UNITED STATES PATENT OFFICE
CERTIFICATE OF CORRECTION

Patent No. 2,893,009 July 7, 1959

Charles H. Bergsland et al

It is hereby certified that error appears in the printed specification of the above numbered patent requiring correction and that the said Letters Patent should read as corrected below.

Column 5, line 30, for "when the" read -- when one --; column 15, line 6, for "sotpped" read -- stopped --; column 22, line 47, for "comonent" read -- component --; column 24, line 75, for "141" read -- 414 --; column 26, line 27, for "accommodate" read -- accommodated --; column 27, line 51, for "wil" read -- will --; column 28, line 57, before ", single phase" insert -- 110 volt --; column 33, line 66, for "attaining" read -- attaching --.

Signed and sealed this 5th day of April 1960.

(SEAL)
Attest:

KARL H. AXLINE
Attesting Officer

ROBERT C. WATSON
Commissioner of Patents